(12) United States Patent
Yamashita

(10) Patent No.: US 12,085,110 B2
(45) Date of Patent: Sep. 10, 2024

(54) NUT AND TIGHTENING METHOD

(71) Applicant: Tomoki Yamashita, Higashiosaka (JP)

(72) Inventor: Tomoki Yamashita, Higashiosaka (JP)

( * ) Notice: Subject to any disclaimer, the term of this patent is extended or adjusted under 35 U.S.C. 154(b) by 767 days.

(21) Appl. No.: 16/699,259

(22) Filed: Nov. 29, 2019

(65) Prior Publication Data

US 2020/0116190 A1 Apr. 16, 2020

Related U.S. Application Data

(63) Continuation of application No. PCT/JP2018/020512, filed on May 29, 2018.

(30) Foreign Application Priority Data

May 29, 2017 (JP) .................................. 2017-105427
Feb. 9, 2018 (JP) .................................. 2018-022577

(51) Int. Cl.
*F16B 39/12* (2006.01)
*F16B 39/24* (2006.01)
*F16B 39/284* (2006.01)

(52) U.S. Cl.
CPC .............. *F16B 39/12* (2013.01); *F16B 39/24* (2013.01); *F16B 39/284* (2013.01)

(58) Field of Classification Search
CPC .......... F16B 33/00; F16B 39/08; F16B 39/10; F16B 39/12; F16B 39/24; F16B 39/284; F16B 43/00

(Continued)

(56) References Cited

U.S. PATENT DOCUMENTS 731,599 A * 6/1903 McGraw, Jr. ........... F16B 39/12
411/223
792,146 A * 6/1905 Mills et al. ............. F16B 39/24
411/157

(Continued)

FOREIGN PATENT DOCUMENTS

CN 105927653 A 9/2016
GB 557855 A 12/1943

(Continued)

OTHER PUBLICATIONS

Partial Supplementary European Search Report dated Jan. 28, 2021.

(Continued)

*Primary Examiner* — Roberta S Delisle
(74) *Attorney, Agent, or Firm* — Harness, Dickey & Pierce, P.L.C

(57) ABSTRACT

Provided is a nut that resists being loosened and is easy to be tightened. A nut 600 includes a nut main body 10 having a tapped hole 30 formed therein; an annular member 41 formed on the side of a top surface of the nut main body 10; and an outer frame member 45 formed on the side of an outer edge of the annular member 41. The annular member 41 includes a second end portion 42b in contact with a top surface 11 of the nut main body 10 and a first end portion 42a located opposite to the second end portion 42b. A top surface of the first end portion 42a is located above a top surface of the second end portion 42b. A first gap 40 is formed between the first end portion 42a and the top surface 11 of the nut main body 10. A second gap 49 is formed between a side surface of the annular member 41 and an inner wall 47 of the outer frame member 45. The top surface of the first end portion 42a of the annular member 41 is located above a top surface 46 of the outer frame member (Continued)

45. The inner wall 47 of the outer frame member 45 is inclining while tapering in an upward direction.

27 Claims, 21 Drawing Sheets

(58) Field of Classification Search
USPC ........ 411/204, 222, 223, 225, 248, 432, 517
See application file for complete search history.

(56) References Cited

U.S. PATENT DOCUMENTS

| | | | | |
|---|---|---|---|---|
| 860,758 | A * | 7/1907 | Morey | F16B 39/24 |
| | | | | 411/313 |
| 1,128,186 | A * | 2/1915 | Raeburn | F16B 39/12 |
| | | | | 411/223 |
| 1,264,815 | A * | 4/1918 | Kruttschnitt | F16B 39/12 |
| | | | | 411/277 |
| 1,611,210 | A | 12/1926 | Liddell | |
| 1,829,017 | A | 10/1931 | Saben | |
| 1,904,263 | A | 4/1933 | Berge | |
| 2,222,460 | A * | 11/1940 | Crowley | F16B 39/38 |
| | | | | 411/285 |
| 2,487,219 | A | 11/1949 | Butler | |
| 3,800,396 | A | 4/1974 | Puchner | |
| 4,019,550 | A * | 4/1977 | DeHaitre | F16B 39/34 |
| | | | | 411/303 |
| 4,248,285 | A * | 2/1981 | Flaig | F16B 39/34 |
| | | | | 411/222 |
| 5,595,466 | A * | 1/1997 | DeHaitre | F16B 39/34 |
| | | | | 411/303 |
| 5,662,443 | A * | 9/1997 | Dziaba | F16B 39/286 |
| | | | | 411/291 |
| 9,267,534 | B2 * | 2/2016 | Flaig | F16B 39/38 |

FOREIGN PATENT DOCUMENTS

| | | |
|---|---|---|
| JP | S5721818 A | 2/1982 |
| JP | S57112124 A | 7/1982 |
| JP | S58040612 A | 3/1983 |
| JP | S59088508 A | 5/1984 |
| JP | S61-011014 A | 1/1986 |
| JP | S61244912 A | 10/1986 |
| JP | H9280239 A | 10/1997 |
| JP | 2001271820 A | 10/2001 |
| JP | 2003021127 A | 1/2003 |
| JP | 2009209945 A | 9/2009 |
| JP | 201133047 A | 2/2011 |
| JP | 2013224679 A | 10/2013 |
| JP | 2016145607 A | 8/2016 |
| JP | 6083632 B1 | 2/2017 |
| JP | 2017036810 A | 2/2017 |
| KR | 200443393 Y1 | 2/2009 |
| KR | 20100122548 A | 11/2010 |
| NL | 77743 C | 3/1955 |

OTHER PUBLICATIONS

International Search Report PCT/ISA/210 for International Application No. PCT/JP2018/020512 Dated Aug. 28, 2018.
Japanese Office Action for Japanese Patent Application No. 2018-022577 dated May 24, 2018.
Decision to Grant for Japanese Patent Application No. 2018-022577 dated Sep. 4, 2018.
Decision to Grant for Japanese Patent Application No. 2018-188641 dated Feb. 5, 2019.
Decision to Grant for Japanese Patent Application No. 2019-042087 dated Jun. 11, 2019.
Extended European Search Report dated May 31, 2023.

* cited by examiner

NUT AND TIGHTENING METHOD

TECHNICAL FIELD

The present invention relates to a nut and a tightening method, and specifically, to a lock nut and a tightening method using the lock nut.

CROSS-REFERENCE TO RELATED APPLICATIONS

This application is a continuation of PCT International Application No. PCT/JP2018/020512 which has an International filing date of May 29, 2018, which claims the benefit of priority based upon Japanese Patent Application No. 2017-105427 filed on May 29, 2017 and Japanese Patent Application No. 2018-022577 filed on Feb. 9, 2018, the entire contents of each of which are hereby incorporated by reference.

BACKGROUND ART

Conventionally, bolts and nuts are used highly frequently for various members of transportation machines such as automobiles, aircrafts, trains and the like; various types of industrial machines and devices; transportation pipelines; power transmission devices; and the like. Such bolts and nuts are highly important as machine elements used to tighten various types of tightening members. However, there may be a case where a nut tightened to a male thread portion of a bolt is loosened by an external force such as a vibration or the like applied to a member tightened by the bolt and the nut, the bolt itself or the like, and as a result, the screwing force or the tightening force is decreased. There may also be a case where a nut screwed to a bolt is disengaged and as a result, a tightened portion of a tightened member is disengaged. In such a situation, a nut and a bolt, by which the nut resists being loosened from the bolt by an external force such as a vibration or the like applied to a tightened member, the bolt itself or the like, are desired to improve the safety of a tightened portion of the tightened member (e.g., Patent Document 1 and the like).

Recently, various types of nuts and bolts have been developed to prevent the nut from being loosened from the bolt. Especially, some nuts that resist being loosened (lock nuts) have been proposed. One such well-known nut is a hard lock nut (registered trademark; hereinafter, this representation will be omitted) (e.g., Patent Documents 2 and 3). FIG. 1 and FIG. 2 show a hard lock nut disclosed in Patent Document 2.

FIG. 1 and FIG. 2 show a tightening structure 1000 including a hard lock nut 103. FIG. 1 is an exploded view in a state before the hard lock nut 103 is tightened. FIG. 2 shows the tightening structure 1000 constructed by the hard lock nut 103 and a bolt 102.

The hard lock nut 103 is a set of a top nut 104 and a bottom nut 105, and is used together with the bolt 102. The bolt 102 has a single-start thread portion having an outer diameter D and a pitch P. The thread portion has a shape with which peaks 110 are continued to each other by an arcked concaved plane 112 including a trough 111. A screw groove 113 has a helical angle $\theta$.

The top nut 104 has a tapering fitting recess 114 formed therein, and the tapering fitting recess 114 is opened downward and has a diameter decreasing in an upward direction. The tapering fitting recess 114 is provided such that an axis 115 thereof matches a tapped hole center 116. The bottom nut 105 includes a truncated cone-shaped fitting portion 117, having the same shape as that of the tapering fitting recess 114, provided on the side of a top surface thereof. The truncated cone-shaped fitting portion 117 protrudes upward. An axis 118 of the truncated cone-shaped fitting portion 117 is located to be eccentric from the tapped hole center 116 by such a distance (a) that allows the truncated cone-shaped fitting portion 117 to be inserted into the tapering fitting recess 114 when the top nut 104 is tightened to the bottom nut 105, while the top nut 104 and the bottom nut 105 are sliding against each other.

In each of the top nut 104 and the bottom nut 105, troughs 119 are provided so as to be along the peaks 110 of the bolt 102. The troughs 119 are continued to each other by an arcked convexed plane 120 to form a thread portion 121. Thus, the female thread portion is constructed.

In this hard lock nut 103, the axis 118 is eccentric by the distance (a) from the tapped hole center 116. The bottom nut 105 is tightened and then the top nut 104 is tightened, and thus the truncated cone-shaped fitting portion 117 is fit into the tapering fitting recess 114. At this point, a wedge action is caused because of the eccentricity. As a result, the hard lock nut 103 is strongly secured while maintaining an inner stress in a shearing direction. Therefore, a nut locking effect that is not conventionally provided may be provided.

Recently, an improved hard lock nut as shown in FIG. 3 has been proposed (Patent Document 3). In the hard lock nut shown in FIG. 3, the bottom nut 105 includes protrusions 125 extending in a diametrically outward direction in order to prevent the nut from being loosened even in the case where the nut seat is unstable. In each of the hard lock nuts 103 shown in FIG. 1 through FIG. 3 (Patent Documents 2 and 3), a combination of the top nut 104 and the bottom nut 105 may be tightened by eccentric fitting to construct a strong tightening structure.

As a lock nut other than the hard lock nut, a nut having a slit formed in a part thereof has been proposed (Patent Document 4). The nut disclosed in Patent Document 4 has a simple structure with a small number of members and thus is easy to be attached, and provides a high locking effect.

FIG. 4 and FIG. 5 show a structure of a lock nut 3000 disclosed in Patent Document 4. FIG. 4 shows the lock nut 3000 usable together with a normal nut 3100. FIG. 5 shows a state where a combination of the nuts 3100 and 3000 is screwed into a bolt 1307 to tighten tightened members 1308 and 1309.

As shown in FIG. 4, the normal nut 3100 has a tapped hole 1304 formed therein. Similarly, the lock nut 3000 has a tapped hole 1304 formed therein. The lock nut 3000 has a first slit 1301 and a second slit 1302 formed therein. The first slit 1301 and the second slit 1302 are formed to cross the tapped hole 1304 and are located to partially overlap each other in an axial direction thereof. When a compressive force is applied to the lock nut 3000, a gap between the slits 1301 and 1302 is elastically contracted in the axial direction. As a result, a strong double nut structure is formed by the deformation of the gap. Thus, the lock nut 3000 is not loosened. The lock nut 3000 is formed of one member, and therefore, is easy to be handled and may be tightened to the bolt 1307 quickly.

A lock nut as in Patent Document 1 has been proposed. FIG. 6 and FIG. 7 show a nut disclosed in Patent Document 1. FIG. 6 shows a nut 4000 having one slit 1405 formed in a nut main body 1402. FIG. 7 shows a nut 4100 having two slits 1405 formed in the nut main body 1402.

In the nut 4000 shown in FIG. 6, a female thread portion 1403 is formed from the side of a top surface 1402a toward the side of a nut seat 1402*b* of the nut main body 1402. The top surface 1402*a* of the nut main body 1402 includes chamfered portions 1450. The nut main body 1402 includes a flat portion 1404 formed by a predetermined length on an inner circumferential wall thereof. The flat portion 1404 has the slit 1405 cut out formed from the side of an outer circumferential wall 1402*c* toward an axis of the nut main body 1402. The nut 4100 shown in FIG. 7 has basically the same structure. In the nut 4100, the flat portions 1404 are provided on the side of a top surface and the side of a nut seat, and the slit 1405 is formed in each of the flat portions 1404.

In the case of the nut 4000 and the nut 4100 disclosed in Patent Document 1, a lock nut may be formed by merely forming the slit(s) 1405 in the flat portion(s) 1404. Therefore, the nut 4000 and the nut 4100 each have a simple structure and are highly productive. In addition, merely screwing one such lock nut into a mail screw such as a bolt or the like allows a tightening target member to be tightened, with the tightening force not being decreased by an external force such as a vibration or the like. Therefore, the nut 4000 and the nut 4100 are highly useful and convenient.

CITATION LIST

Patent Document

Patent Document 1: Japanese Patent Laid-Open Publication No. 2001-271820

Patent Document 2: Japanese Patent Laid-Open Publication No. Hei 9-280239

Patent Document 3: Japanese Patent Laid-Open Publication No. 2016-145607

Patent Document 4: Japanese Patent Laid-Open Publication No. 2011-33047

SUMMARY OF THE INVENTION

Technical Problem

While studying existing nuts (especially, lock nuts), the present inventor noticed the following problems.

First, the hard lock nut 103 shown in FIG. 1 and the like has a special structure that may perform eccentric fitting, and therefore, has a problem of requiring higher production cost (or purchase cost) than a normal nut. Such an expensive nut cannot be used for all the tightening structures. In actuality, a nut that may be tightened firmly without being loosened while having a simple structure and being low-cost is often desired.

The hard lock nut 103 includes the top nut 104 and the bottom nut 105 having a special structure. In a working process, it may be desired to tighten a member strongly with only one nut. In the case where two nuts (the top nut 104 and the bottom nut 105) are used, a work of assembling the nuts is additionally needed, and it is also required to manage both types of special nuts (104, 105) properly and store the same number of the two types of nuts as pairs. Such a work of managing the nuts may be troublesome at the site of the operation. Namely, if the work is done with one lock nut, it is merely needed to prepare and use one lock nut, which is convenient. The hard lock nut 103 complicates the work of attachment and requires more time and more working cost.

The present inventor also studied the nut having a slit. The present inventor has noticed that the people who developed the existing nut with a slit are satisfied with providing a slit and have not developed any further improvement. It is important that the nut is not loosened, but it is also important that the nut is easy to be tightened. For the ease of tightening, a novel idea is needed.

The present inventor found a technique to solve the above-described problems accidentally in a sense. The present invention, made in light of the above-described point, has a main object of providing a novel lock nut.

Solution to the Problem

A nut according to the present invention includes a nut main body having a tapped hole formed therein; an annular member formed on the side of a top surface of the nut main body; and an outer frame member formed on the side of an outer edge of the annular member. The annular member includes a second end portion in contact with the top surface of the nut main body and a first end portion located opposite to the second end portion. A top surface of the first end portion is located above a top surface of the second end portion. A first gap is formed between the first end portion and the top surface of the nut main body. A second gap is formed between a side surface of the annular member and an inner wall of the outer frame member. The top surface of the first end portion of the annular member is located above a top surface of the outer frame member. The inner wall of the outer frame member is inclining while tapering in an upward direction.

In a preferred embodiment, the nut main body includes side surfaces defining a polygonal nut. The annular member has a circular annular shape having an opening, corresponding to the tapped hole, formed therein. A third gap is formed between an end surface of the first end portion and an end surface of the second end portion of the annular member. The inner wall of the outer frame member is inclining such that the second gap is made larger in a direction from the top surface of the nut main body toward the top surface of the outer frame member.

In a preferred embodiment, in a state where the nut is tightened, the first end portion of the annular member is in contact with the top surface of the nut main body, and the side surface of the annular member is in contact with the inner wall of the outer frame member.

In a preferred embodiment, in a state where the nut is tightened, a top surface of the annular member including the first end portion and the second end portion is at the same level as that of the top surface of the outer frame member.

In a preferred embodiment, in a state where the nut is tightened, an end surface of the first end portion and an end surface of the second end portion of the annular member are in contact with each other.

In a preferred embodiment, the nut main body includes a side surface defining a polygonal nut. An outer side surface of the outer frame member is formed to be continuous with the side surface of the nut main body at the same plane.

In a preferred embodiment, the nut main body, the annular member and the outer frame member are formed of a metal material.

In a preferred embodiment, the nut main body, the annular member and the outer frame member are integrally molded.

In a preferred embodiment, the top surface of the nut main body and the top surface of the outer frame member are along a horizontal direction perpendicular to a vertical direction. The annular member has a structure extending spirally upward from the second end portion.

In a preferred embodiment, an inner wall of a central opening of the annular member has a screw groove, corresponding to the tapped hole of the nut main body, formed therein.

A nut according to the present invention includes a nut main body having a tapped hole formed therein; an annular member formed on the side of a top surface of the nut main body; and an outer frame member formed on the side of an outer edge of the annular member. The annular member includes a second end portion in contact with the top surface of the nut main body and a first end portion located opposite to the second end portion. A top surface of the first end portion is located above a top surface of the second end portion. A first gap is formed between the first end portion and the top surface of the nut main body. A part of a top surface of the outer frame member is an extending portion extending toward the center. The extending portion presses a top surface of the annular member.

In a preferred embodiment, an inner wall of the outer frame member is inclining while tapering upward. In a state where the bolt is tightened, a gap is present between the annular member and the top surface of the nut main body.

A pair nut according to the present invention is a pair nut including a first nut and a second nut. The first nut includes a nut main body having a tapped hole formed therein, a top surface of the nut main body, a side surface defining the top surface, and a bottom surface of the nut main body located opposite to the top surface. A central axis of the tapped hole of the first nut matches a central axis of a bolt corresponding to the pair nut. The first nut has a bottom opening in the bottom surface thereof, the bottom opening having a diameter longer than a diameter of the tapped hole. A central axis of the bottom opening extends while inclining with respect to the central axis of the bolt corresponding to the pair nut. The second nut includes a nut main body having a tapped hole formed therein, a top surface of the nut main body, a side surface defining the top surface, and a bottom surface of the nut main body located opposite to the top surface. The second nut includes a top protrusion on the top surface thereof, the top protrusion corresponding to the bottom opening of the first nut. The central axis of the tapped hole formed in the protrusion and the nut main body matches the central axis of the bolt corresponding to the pair nut.

In a preferred embodiment, the bottom opening of the first nut has a bottom inclining plane shaped like a cut-out portion of a side surface of a conical shape. The top protrusion of the second nut has an inclining outer side surface.

In a preferred embodiment, in a state where the top protrusion of the second nut is inserted into the bottom opening of the first nut, a gap is formed between the bottom surface of the first nut and the top surface of the second nut. In a state where the first nut and the second nut are tightened to the bolt, the bottom surface of the first nut and the top surface of the second nut are in contact with each other.

In a preferred embodiment, the bottom inclining plane of the first nut has a plurality of grooves, extending radially, formed therein.

In a preferred embodiment, an outer side surface of the top protrusion of the second nut has a plurality of convexed portions formed thereon.

In a preferred embodiment, in a state where the top protrusion of the second nut is inserted into the bottom opening of the first nut, the side surface of the first nut and the side surface of the second nut are covered with a shrink film, and the first nut and the second nut are secured to each other to be integral.

In a preferred embodiment, the side surface of the first nut and the side surface of the second nut define a polygonal nut.

In a preferred embodiment, the side surface of the first nut and the side surface of the second nut of the pair nut are aligned to each other in a vertical direction. Before the pair nut is tightened to the bolt, there is a gap between the bottom surface of the first nut and the top surface of the second nut. After the pair nut is tightened to the bolt, the shrink film is broken, and the bottom surface of the first nut and the top surface of the second nut are in contact with each other.

In a preferred embodiment, the top surface and the bottom surface of the first nut are parallel to each other. The top surface and the bottom surface of the second nut are parallel to each other.

A nut according to the present invention includes a nut main body having a tapped hole formed therein; a top surface of the nut main body; a side surface defining the top surface, and a bottom surface of the nut main body located opposite to the top surface. A central axis of the tapped hole of the nut main body matches a central axis of a bolt corresponding to the nut. The nut main body has a bottom opening in the bottom surface thereof, the bottom opening having a diameter longer than a diameter of the tapped hole. The bottom opening is formed so as to have an inclining plane having a different angle.

A nut according to the present invention includes a nut main body having a tapped hole formed therein, a top surface of the nut main body, and a side surface defining the top surface. The side surface of the nut main body has a slit formed therein. The top surface of the nut main body is inclining such that the slit is at the higher level on the side of a cut-out opening.

In a preferred embodiment, the side surface of the nut main body extends in a vertical direction. The top surface and the slit extend in an oblique direction at the same angle with respect to a horizontal direction perpendicular to the vertical direction.

In a preferred embodiment, the side surface of the nut main body extends in the vertical direction. The top surface extends in an oblique direction, and the slit extends in the horizontal direction, with respect to the horizontal direction perpendicular to the vertical direction.

In a preferred embodiment, a bottom surface of the nut main body located opposite to the top surface is inclining such that the slit is at the higher level on the side of a cut-out opening.

In a preferred embodiment, in a state where the nut is tightened, the inclining top surface is deformed to extend in the horizontal direction perpendicular to the vertical direction.

In a preferred embodiment, the nut main body having the inclining top surface and the side surface having the slit formed therein is integrally formed of the same metal material.

A tightening structure according to the present invention includes the above-mentioned pair nut, a bolt corresponding to the tapped hole of the pair nut, and a tightening target member tightened by the pair nut and the bolt.

A tightening structure according to the present invention includes the above-described nut; a bolt corresponding to the tapped hole of the nut; and a tightening target member that is tightened by the nut and the bolt. The tightening target member has a tapped hole, corresponding to the bolt, formed therein.

A bolt according to the present invention includes a bolt shaft having a thread portion on at least a portion thereof; and a bolt head formed at an end of the bolt shaft. The bolt head has a bolt base opening formed in a portion close to the bolt shaft. A washer is inserted into the bolt base opening. The washer includes a first end portion, a second end portion and an extending portion between the first end portion and the second end portion. In a state where the bolt is not tightened, where the second end portion of the washer is in contact with a bottom surface of the bolt base opening, and where there is a gap between the first end portion of the washer and the bottom surface of the bolt base opening, the washer is accommodated in the bolt base opening.

In a preferred embodiment, an outer frame member is formed outer to the bolt base opening accommodating the washer, the outer frame member defining the bolt base opening. An inner wall of the outer frame member is inclining while tapering an upward direction.

In a preferred embodiment, in a state where the bolt is not tightened, a top surface of a first end portion of the washer is located above a top surface of the outer frame member, and a top surface of the second end portion of the washer is located below the top surface of the outer frame member.

In a preferred embodiment, in a state where the bolt is tightened, the top surface of the first end portion of the washer is at the same plane as that of the top surface of the outer frame member, and there is a gap between the top surface of the second end portion of the washer and a tightening target member.

In a preferred embodiment, an outer frame member defining the bolt base opening is formed outer to the bolt base opening accommodating the washer. In a state where the bolt is not tightened, a part of a top surface of the outer frame member is an extending portion extending toward the bolt base opening. The extending portion presses a top surface of the washer.

In a preferred embodiment, in a state where the bolt is tightened, there is a gap between the washer and the bottom surface of the bolt base opening.

In a preferred embodiment, the bolt head includes at least one element selected from the group consisting of a polygonal nut shape, a driver groove and a wrench opening. The first end portion of the washer is secured while being attached to the bottom surface of the bolt base opening.

A tightening method according to the present invention is a method for tightening a tightening target member, and includes the steps of preparing the above-described pair nut, preliminarily securing the tightening target member by the pair nut and the bolt corresponding to the tapped hole of the pair nut, and performing screwing to the preliminarily secured tightening target member.

A tightening method according to the present invention is a method for tightening a tightening target member, and includes the steps of preparing the above-described nut, preliminarily securing the tightening target member by the nut and the bolt corresponding to the tapped hole of the nut, and performing screwing to the preliminarily secured tightening target member.

A securing method according to the present invention is a securing method using a tightening member. The tightening member includes an annular member including a first end portion and a second end portion, a third gap is formed between an end surface of the first end portion and an end surface of the second end portion, the annular member extends in a spiral manner such that a top surface of the first end portion is located above a top surface of the second end portion, and the tightening member includes, in addition to the annular member, an outer frame member having an inclining plane approaching a side surface of the annular member. The securing method according to the present invention includes the steps of preparing the tightening member; putting the first end portion of the annular member of the tightening member into contact with a tightening target member to push the first end portion; pressing the side surface of the annular member onto the inclining plane along with the step of pushing; and putting a top surface of the annular member including the first end portion and the second end portion into contact with the tightening target member.

In a preferred embodiment, an inner wall of a central opening of the annular member has a screw groove formed therein, as a result of the step of putting the top surface of the annular member including the first end portion and the second end portion into contact with the tightening target member, the top surface of the annular member is entirely at the same level, and the end surface of the first end portion and the end surface of the second end portion are in contact with each other.

In a preferred embodiment, as a result of the step of putting the top surface of the annular member including the first end portion and the second end portion into contact with the tightening target member, the top surface of the first end portion of the annular member is at the same plane as that of the top surface of the outer frame member, and there is a gap between the top surface of the first end portion and the top surface of the second end portion of the annular member.

In a preferred embodiment, the tightening member is the above-described nut.

In a preferred embodiment, the annular member is a washer, and the tightening member is the above-described bolt.

A nut according to the present invention includes a nut main body having a tapped hole formed therein, an annular member formed on the side of a top surface of the nut main body, and an outer frame member formed on the side of an outer edge of the annular member.

The annular member includes a second end portion in contact with the top surface of the nut main body and a first end portion located opposite to the second end portion. A top surface of the first end portion is located above a top surface of the second end portion. A first gap is formed between the first end portion and the top surface of the nut main body.

In a preferred embodiment, a side surface of the second end portion of the annular member is substantially in contact with an inner wall of the outer frame member. The outer frame member may be a member separate from the nut main body.

In a nut (female nut) according to an embodiment of the present invention, the tapped hole extends from a vertical direction (direction of the bolt shaft). A central axis of an opening (tapering opening) located around the tapped hole is formed to extend while being shifted from the vertical direction. An opening shaped like a cut-out portion of a conical shape is formed around the tapped hole. The nut (female nut) is used in combination with a nut (male nut) including a protrusion.

In a nut (female nut) according to an embodiment of the present invention, the tapped hole extends from a vertical direction (direction of the bolt shaft). An opening (tapering opening) located around the tapped hole is formed to have an inclining plane inclining at different angles. The nut (female nut) is used in combination with a nut (male nut) including a protrusion.

A pair nut according to an embodiment of the present invention includes a first nut and a second nut. A side surface of the first nut and a side surface of the second nut are covered with a resin film (e.g., an annular film or a shrink film), and thus the first nut and the second nut are integrally secured. In an embodiment, the side surface of the first nut and the side surface of the second nut define a polygonal nut, and are aligned to each other in a vertical direction.

Advantageous Effects of Invention

A nut according to the present invention includes an annular member formed on the side of a top surface of a nut main body having a tapped hole formed therein, and an outer frame member formed on the side of an outer edge of the annular member. A first gap is formed between a first end portion of the annular member and the top surface of the nut main body. A second gap is formed between a side surface of the annular member and an inner wall of the outer frame member. A top surface of the first end portion of the annular member is located above a top surface of the outer frame member. The inner wall of the outer frame member is inclining (or tapering) such that the second gap is made larger in an upward direction. Therefore, when the nut according to the present invention is to be tightened with a bolt, the first end portion of the annular member first contacts a tightening target member (in the case of a double nut, contact the other nut), and is pushed to eliminate the first gap. Thus, the nut may firmly bite into the threads of the bolt. This will be described more specifically. At the time of tightening, the annular member is deformed in such a direction as to eliminate the first gap. Thus, the gap (backlash) formed at a position where the female thread portion and the male thread portion are in engagement with each other is eliminated, and the female thread portion (nut) and the male thread portion (bolt) may be put into close contact with each other. A strong frictional force may be provided by the female thread portion (nut) and the male thread portion (bolt). As a result, a situation is certainly prevented in which the nut is loosened from the male thread portion such as a bolt or the like by a vibration or the like and thus the screwing force is decreased. After the first end portion is pushed, the annular member is deformed in such a direction as to expand outward. This deformation may be stopped by the inner wall of the outer frame member, and the force is prevented from escaping. In addition, since the inner wall of the outer frame member is tapering (inclining such that the second gap becomes larger in an upward direction), the force that deforms the annular member outward may be favorably adjusted to firmly perform the tightening. Furthermore, the annular member may protect the tightening portions against foreign substances that influence the tightening portions and the external force. Therefore, the tightening force of the tightening structure may be certainly protected. As a result, a nut that resists being loosened and is easy to be tightened may be realized.

In the pair nut according to the present invention, the central axis of the tapped hole of the first nut and the second nut matches the central axis of the bolt. The first nut has a bottom opening formed in a bottom surface thereof, and the central axis of the bottom opening extends while inclining with respect to the central axis of the bolt. The second nut includes a top protrusion formed on a top surface thereof. Therefore, when the top protrusion of the second nut is inserted into the bottom opening of the first nut to tighten the first nut and the second nut to each other, a top surface of the top protrusion of the second nut contacts the bottom opening of the first nut non-uniformly (with one side being prioritized), instead of uniformly, because the central axis of the bottom opening of the first nut extends while inclining. Therefore, the second nut first enters the bottom opening of the first nut while slightly inclining. This may eliminate the gap (backlash) formed at a position where the female thread portion (nut) and the male thread portion (bolt) are in engagement with each other, and put the female thread portion (nut) and the male thread portion (bolt) into close contact with each other. As a result, the female thread portion (nut) and the male thread portion (bolt) may provide a strong frictional force, and thus a situation is certainly prevented in which the nut is loosened from the male thread portion such as the bolt or the like by a vibration or the like and thus the screwing force is decreased.

In addition, the central axis of the tapped hole of the first nut and the second nut matches the central axis of the bolt. Therefore, the first nut and the second nut are easier to be produced as compared with the first nut and the second nut that do not have a matching central axis. The central axis of the tapped hole of the first nut and the second nut matches the central axis of the bolt. Therefore, the first nut and the second nut (pair nut) may be outserted to the bolt in one outserting operation (rotating operation), which is convenient. In the case where the central axes of the tapped holes of the first nut and the second nut do not match each other, the first nut and the second nut need to be outserted to the bolt by separate operations (rotations). This is twice as troublesome. As compared with this, the pair nut according to the present invention may significantly improve the attaching efficiency to the bolt.

DESCRIPTION OF EMBODIMENTS

Hereinafter, preferred embodiments according to the present invention will be described with reference to the drawings. In the figures referred to below, elements or portions having the same functions will bear the same reference signs, and overlapping descriptions may be omitted or simplified, for the sake of simplicity. In the figures, relative sizes (length, width, thickness, etc.) may not accurately reflect the actual relative sizes although it is basically attempted to represent the actual relative sizes.

Elements which are other than elements specifically referred to in this specification but are necessary to carry out the present invention may be grasped as a matter of design choice for a person of ordinary skill in the art based on the conventional technology in this field. The present invention may be carried out based on the contents disclosed by this specification and the attached drawings, and the technological common knowledge in the art.

The present invention is not limited to the following embodiments in any way.

Embodiment 1

Figure 8:
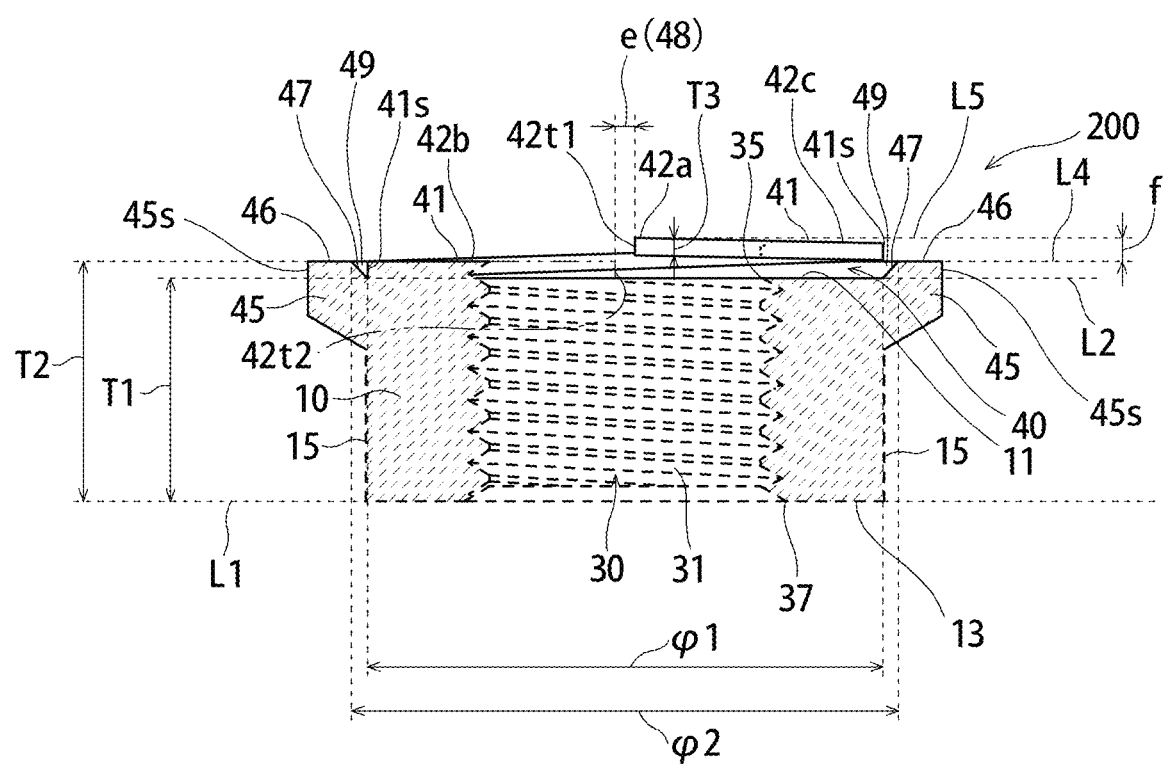
FIG. 8 is a cross-sectional view (front view or side view) provided to describe a nut 200 according to an embodiment of the present invention.
Figure 9:
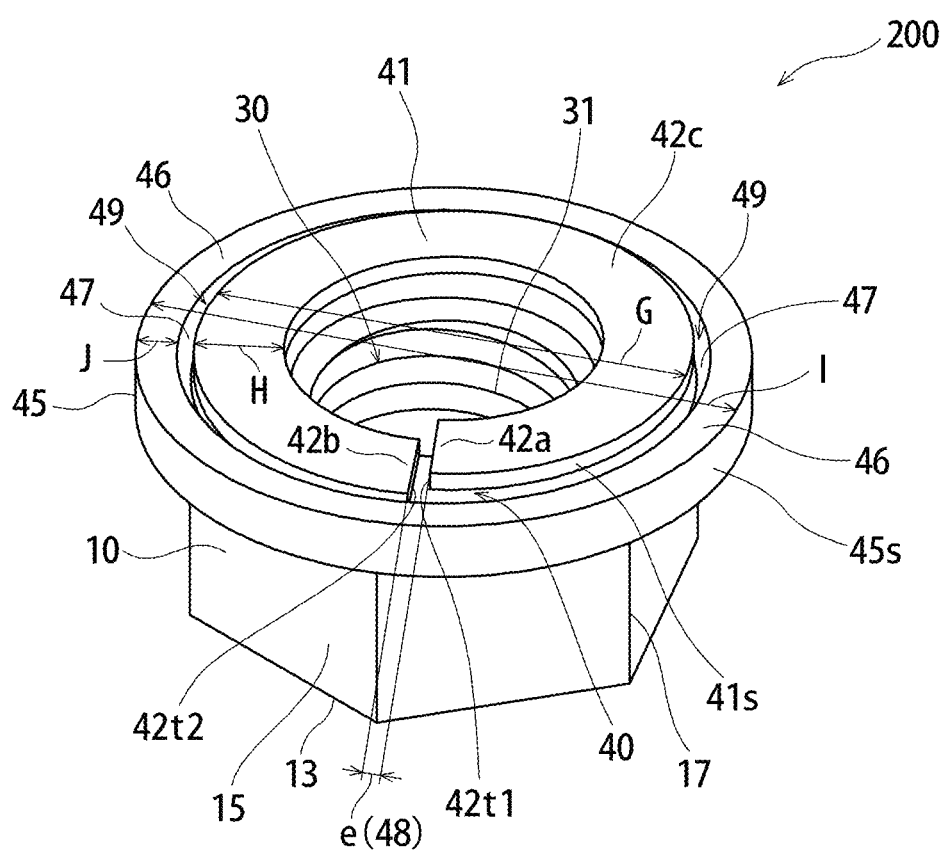
FIG. 9 is a perspective view showing a structure of the nut 200.
Figure 17:
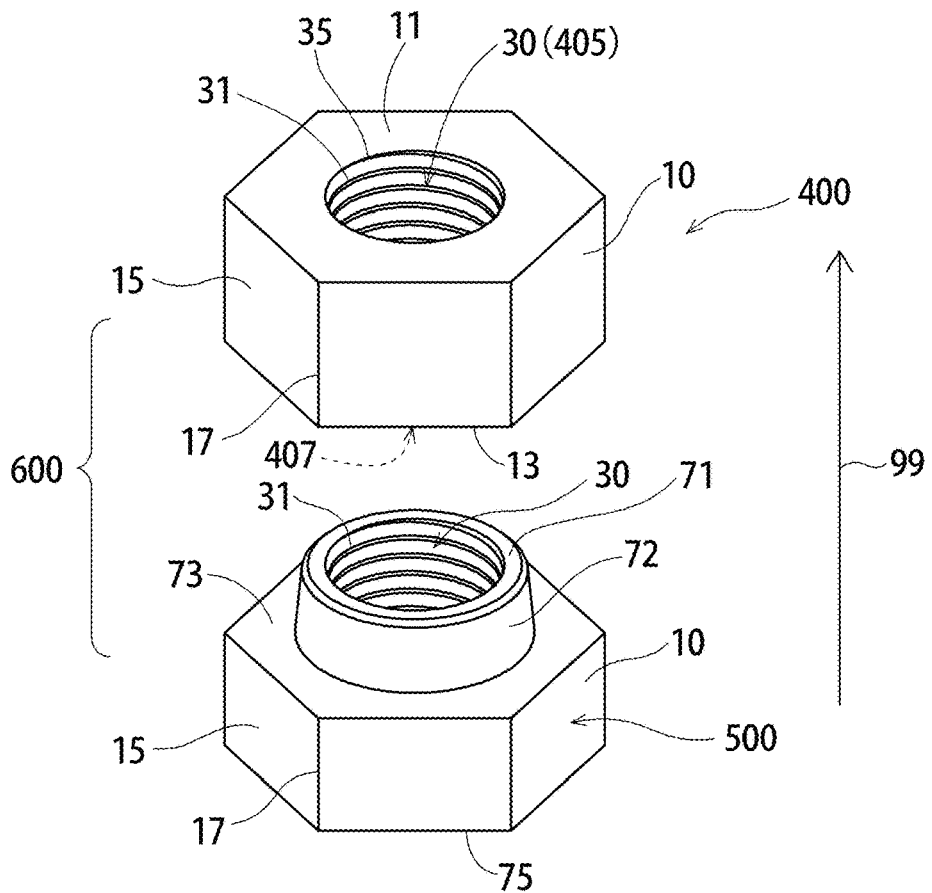
FIG. 17 is a perspective view showing a structure of the nut 400 and a nut 500.
Figure 18:
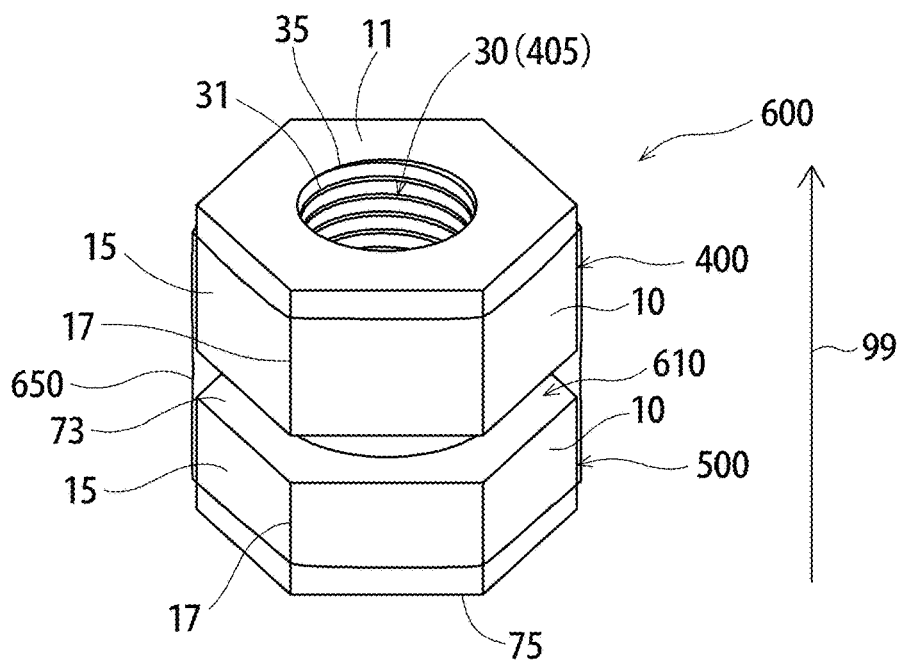
FIG. 18 is a perspective view showing a structure of a pair nut 600 including the nut 400 and the nut 500 in combination.

FIG. 8 is a cross-sectional view (front view or side view) showing a structure of a nut 200 according to embodiment 1 of the present invention. FIG. 9 is a perspective view provided to describe the structure of the nut 200 according to embodiment 1. As shown in FIG. 17 and FIG. 18 referred to below, arrow 99 represents a vertically upward direction, and a direction or an element represented by such an upward direction will be referred to as "top" or "top surface" for the sake of convenience. Since the "upward" direction is used for the sake of convenience, a "top surface" may be directed sideways or downward depending on the orientation of the nut 200.

The nut 200 in this embodiment includes a nut main body 10 having a tapped hole 30 formed therein and an annular member 41 formed on the side of a top surface of the nut main body 10. An outer frame member 45 is formed on the side of an outer edge of the annular member 41.

The nut 200 in this embodiment is a polygonal nut, and in the example shown in the figures, is a hexagonal nut. The nut 200 includes the nut main body 10 having the tapped hole 30 formed therein, and the nut main body 10 has a top surface 11 and side surfaces 15. Threads 31 are formed on an inner surface of the tapped hole 30, and a region between each two threads 31 adjacent to each other is a screw groove. The nut main body 10 has six side surface 15 in the case of the hexagonal nut, and a border 17 is present between two side surfaces 15 adjacent to each other. The top surface 11 of the nut main body 10 is defined by the side surfaces 15. In other words, a surface located above a region enclosed by the side surfaces 15 is the top surface.

The annular member 41 includes a second end portion 42b in contact with the top surface 11 of the nut main body 10 and a first end portion 42a located opposite to the second end portion 42b. A top surface of the first end portion 42a is located above a top surface of the second end portion 42b. A gap 40 is formed between the first end portion 42a and the top surface 11 of the nut main body 10.

In the structure of this embodiment, the annular member 41 has a circular annular shape and has an opening corresponding to the tapped hole 30 formed therein. A gap 48 is formed between an end surface 42t1 of the first end portion 42a and an end surface (42t2) of the second end portion 42b of the annular member (circular annular member) 41. Namely, in this embodiment, the annular member 41 has a cut-out portion (the annular member 41 has an almost circular arcked shape), and the first end portion 42a and the second end portion 42b are separated from each other. An annular extending portion 42c is located between the first end portion 42a and the second end portion 42b of the annular member 41. The annular member 41 has a structure extending spirally upward from the second end portion 42b. A screw groove corresponding to the tapped hole 30 of the nut main body 10 is formed in an inner wall of the opening at a center of the annular member 41. A structure in which no screw groove is formed in the inner wall of the opening at the center of the annular member 41 may be adopted.

In this embodiment, the second end portion 42b is integral with the top surface 11 of the nut main body 10. Alternatively, the second end portion 42b may be joined to the top surface 11 of the nut main body 10 by welding (or any other joining technique). The second end portion 42b is in contact with the top surface 11 of the nut main body 10. Between the other portions (42c, 42a) of the annular member 41 and the top surface 11, the gap 40 is located.

A side surface 41s of the annular member 41 and an inner wall 47 of the outer frame member 45 have a second gap 49 therebetween. The inner wall 47 of the outer frame member 45 is an inclining plane (or a wall including an inclining plane) tapering in an upward direction. Specifically, the inner wall 47 is inclining such that the second gap 49 becomes larger in a direction from the top surface 11 of the nut main body 10 toward a top surface 46 of the outer frame member 45 (namely, is tapering). A portion of the side surface 41s (region almost contacting the top surface 11) may be in contact with the inner wall 47, and the other portions of the side surface 41s may be separated from the inner wall 47 to form the gap 49. An inclination angle (tapering angle) of the inner wall 47 is an angle made by a horizontal line L2 and the inclining plane 47 (on the acute angle side), and is, for example, about 45°±about 25° (for example, 70°, 60°, 45°, etc.). As a specific numerical value, a preferred value may be appropriately adopted in accordance with the use of, or characteristics required of, the nut 200. The tapering angle may be defined by the angle made by a horizontal line L4 and the inclining plane 47 (on the obtuse angle side).

The top surface of the first end portion 42a of the annular member 41 is located above the top surface 46 of the outer frame member 45. In the structure of this embodiment, the top surface 11 of the nut main body 10 is along a horizontal direction perpendicular to the vertical direction (99). Namely, in the structure of this embodiment, the top surface 11 is not inclining and is horizontal. In addition, the top surface 46 of the outer frame member 45 is along a horizontal direction (horizontal surface) perpendicular to the vertical direction. The top surface 11 and the top surface 46 are each described as being a horizontal surface, but may be processed by, for example, chamfering.

Specificities of a tightening operation of the nut 200 in this embodiment will be described below. Briefly describing, when the nut 200 is tightened, the first end portion 42a of the annular member 41 contacts the top surface 11 of the nut main body 10. Namely, the gap 40 is eliminated, and the first end portion 42a (and the second end portion 42b and the annular extending portion 42c) of the annular member 41 contacts the top surface 11 of the nut main body 10. The side surface (outer side surface) 41s of the annular member 41 contacts the inner wall 47 of the outer frame member 45. The top surface of the annular member 41 including the first end portion 42a and the second end portion 42b becomes to be at the same level as that of the top surface 46 of the outer frame member 45. The top surface 46 of the outer frame member 45 is a surface contacting a tightening target member (plate-like member or nut), like the top surface of the annular member 41. In addition, when the nut 200 is put into a tightened state, the end surface 42t1 of the first end portion 42a and the end surface 42t2 of the second end portion 42b of the annular member 41 contact each other. Namely, the first end portion 42a and the second end portion 42b of the annular member 41 contact each other, and the gap 48 is eliminated.

The nut 200 in this embodiment is formed of a metal material. Namely, the nut main body 10, the annular member 41 and the outer frame member 45 are formed of a metal material. The nut 200 may be formed of a material other than the metal material (e.g., resin material or the like). In addition, the nut main body 10, the annular member 41 and the outer frame member 45 are integrally molded. Namely, the nut main body 10, the annular member 41 and the outer frame member 45 are structured continuously of the same material. The nut 200 does not need to be integrally formed, and a part of the members may be attached by welding (or adhesion (e.g., adhesion by an adhesive or pressure-sensitive adhesion by a pressure-sensitive adhesive)). Alternatively, the annular member 41 and the nut main body 10 may be put into contact with each other by gravity. Specifically, the annular member 41 and the nut main body 10 may be formed as separate members, and then the second end portion 42b of the annular member 41 may be put into contact with the top surface 11 of the nut main body 10 by gravity. In the case where the second end portion 42b of the annular member 41 is attached to the top surface 11 of the nut main body 10 (e.g., adhesion by an adhesive, pressure-sensitive adhesion by a pressure-sensitive adhesive, attachment by the viscosity of a liquid, binding by a magnetic force, or the like.), even if the nut 200 is put upside down (or put laterally or obliquely), the annular member 41 does not come off from, or is not offset from, the nut main body 10. Thus, the nut 200 is easy to be handled. In the case where the nut 200 is integrally formed, there are advantages that the strength is increased and that the process of welding or the like is omitted.

As a specific size, structure, material or the like of the nut 200 in this embodiment, a preferred size, structure, material or the like may be appropriately selected in accordance with the using conditions, use, required characteristics, cost or the like. In FIG. 8, size "φ1" is a diameter on the basis of a bottom end of the inclining plane 47. Size "γ2" is a diameter on the basis of a top end of the inclining plane 47. Since the inner wall (inclining plane) 47 is tapering, φ1<φ2. Height "T1" is a distance from a bottom surface 13 to the top surface 11, and height "T2" is a distance from the bottom surface 13 to the top surface 46. "T3" is a thickness of the annular member 41. Size "e" is a size of the gap 48, namely, a distance between the first end portion 42a and the second end portion 42b of the annular member 41. Size "f" is a distance between the top surface of the first end portion 42a and the top surface 46 of the outer frame member 45. Lines "L1" and "L2" are respectively horizontal lines along the bottom surface 13 and the top surface 11 of the nut main body 10. Line "L4" is a horizontal line along the top surface 46 of the outer frame member 45. In FIG. 9, size "G" is the diameter of the annular member (circular annular member) 41. Size "G" is the width of the annular member. Size "I" is the diameter of an outer side surface 45s of the outer frame member 45. As shown in FIG. 9, the wall (or the top surface 46) of the outer frame member 45 has a circular shape (circular annular shape) corresponding to that of the annular member (circular annular member) 41. Size "J" is the width of the top surface 46 of the outer frame member 45. For these sizes, preferred numerical values may be appropriately designed and adopted.

Figure 10:
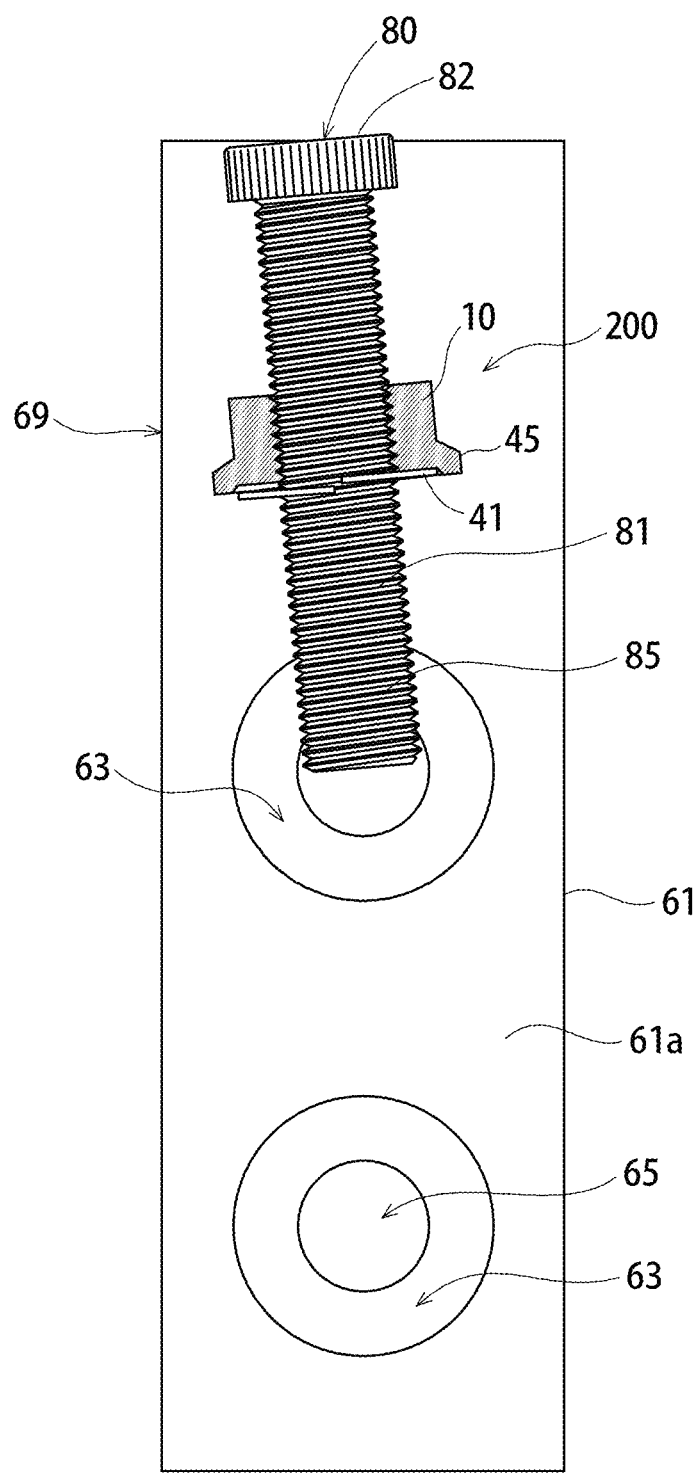
FIG. 10 shows how the nut 200 and a bolt 80 are inserted into a tightening target member 61.

FIG. 10 shows a structure in which the nut 200 in this embodiment is located around a bolt shaft (screw shaft) 85 of a bolt 80. The screw shaft 85 is inserted into an opening 63 formed in a surface 61a of a first member 61, which is a tightening target member 69. A tapped hole 65 is formed in a bottom surface of the opening 63. The tapped hole 65 may be formed in the first member 61 with no opening 63, and the screw shaft 85 may be inserted into the tapped hole 65.

Figure 5:
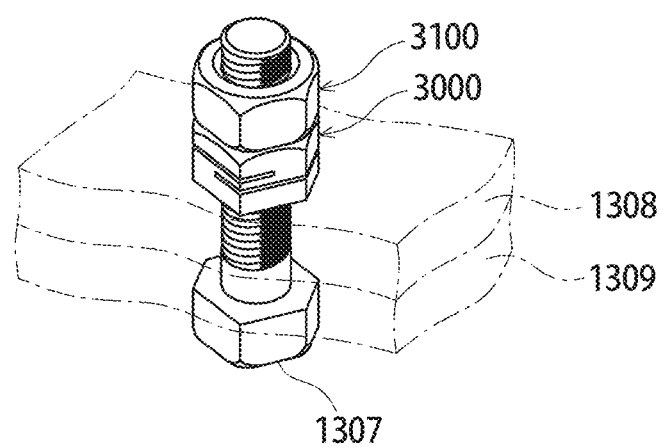
FIG. 5 is a perspective view showing a tightening state of tightening target members 1308 and 1309 screwed together by a combination of the nuts 3100 and 3000 and a bolt 1307.
Figure 6:
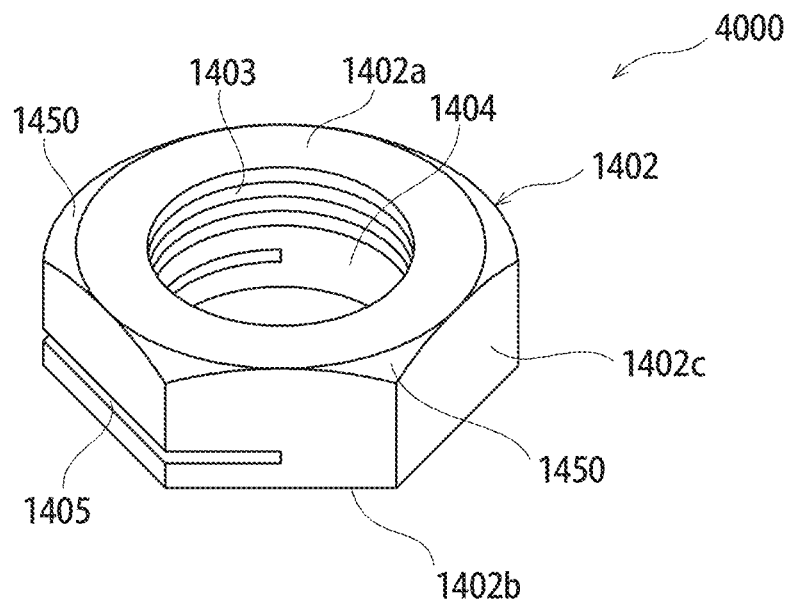
FIG. 6 is a perspective view showing a nut 4000 having one slit 1405 formed therein.
Figure 7:
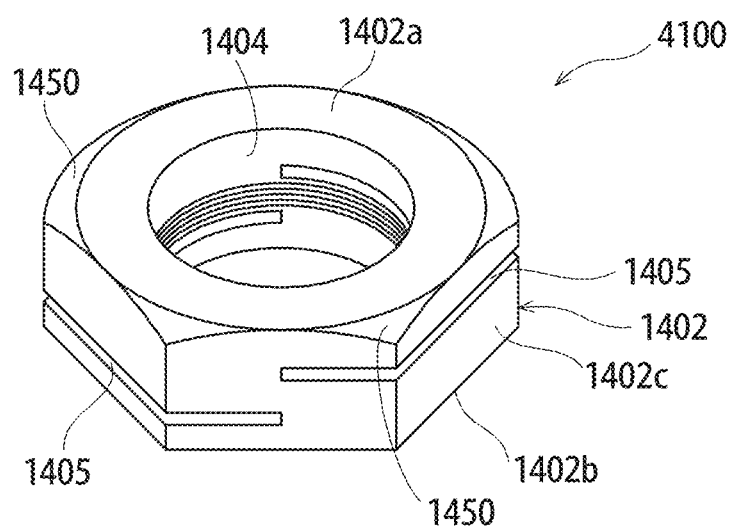
FIG. 7 is a perspective view showing a nut 4100 having two slits 1405 formed therein.

Around the screw shaft 85 shown in FIG. 10, a normal nut (typical nut (e.g., the normal nut 3100 shown in FIG. 5) and the nut 200 in this embodiment may be combined together in a double-nut structure (structure shown in FIG. 5). A member other than a nut, for example, a washer or the like, may be provided together with the nut 200. In the case where a plurality of the nuts 200 in this embodiment are tightened to each other while top surfaces thereof (annular members 41) are in contact with each other, a double-nut structure having a stronger tightening force may be constructed as compared with a double-nut structure including normal nuts (3100) (or including a combination of the normal nut 3100 and the nut 200). In the tightening structure using the nut 200 in this embodiment (especially in the double-nut structure of the nuts 200), the top surface 11 of the nut 200 (tightening surface side) is crushed and it becomes very difficult to rotate the nut 200 in an opposite direction to be disengaged. In addition, in the case where the nuts 200 are tightened to each other while the top surfaces (annular members 41) are in contact with each other, the nuts 200 are engaged with each other more strongly and more difficult to be disengaged. It is very difficult to rotate the nuts 200 in opposite directions to be disengaged (loosened) from each other.

Figure 11:
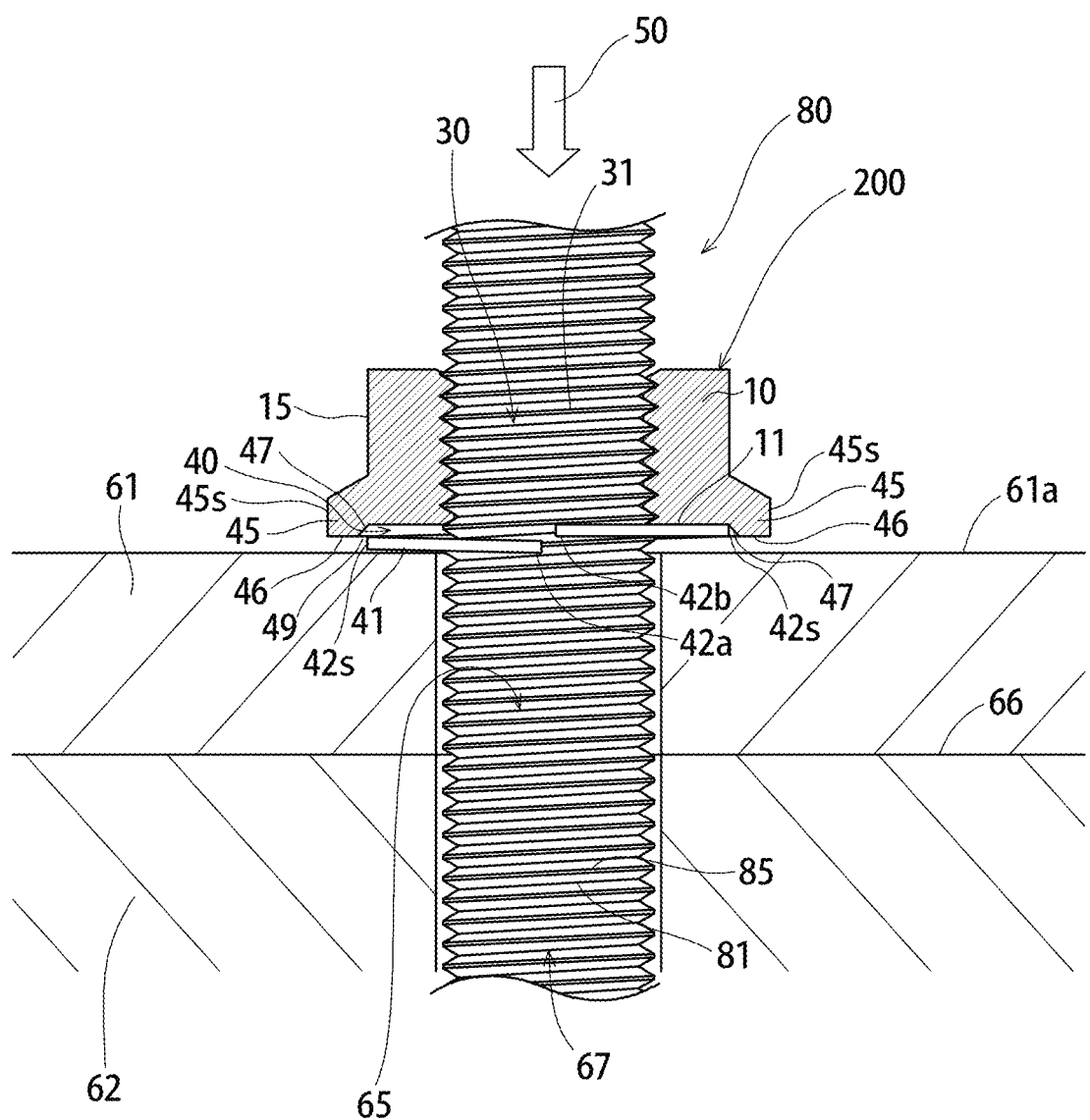
FIG. 11 is a cross-sectional view provided to describe how tightening is performed by the nut 200.
Figure 12:
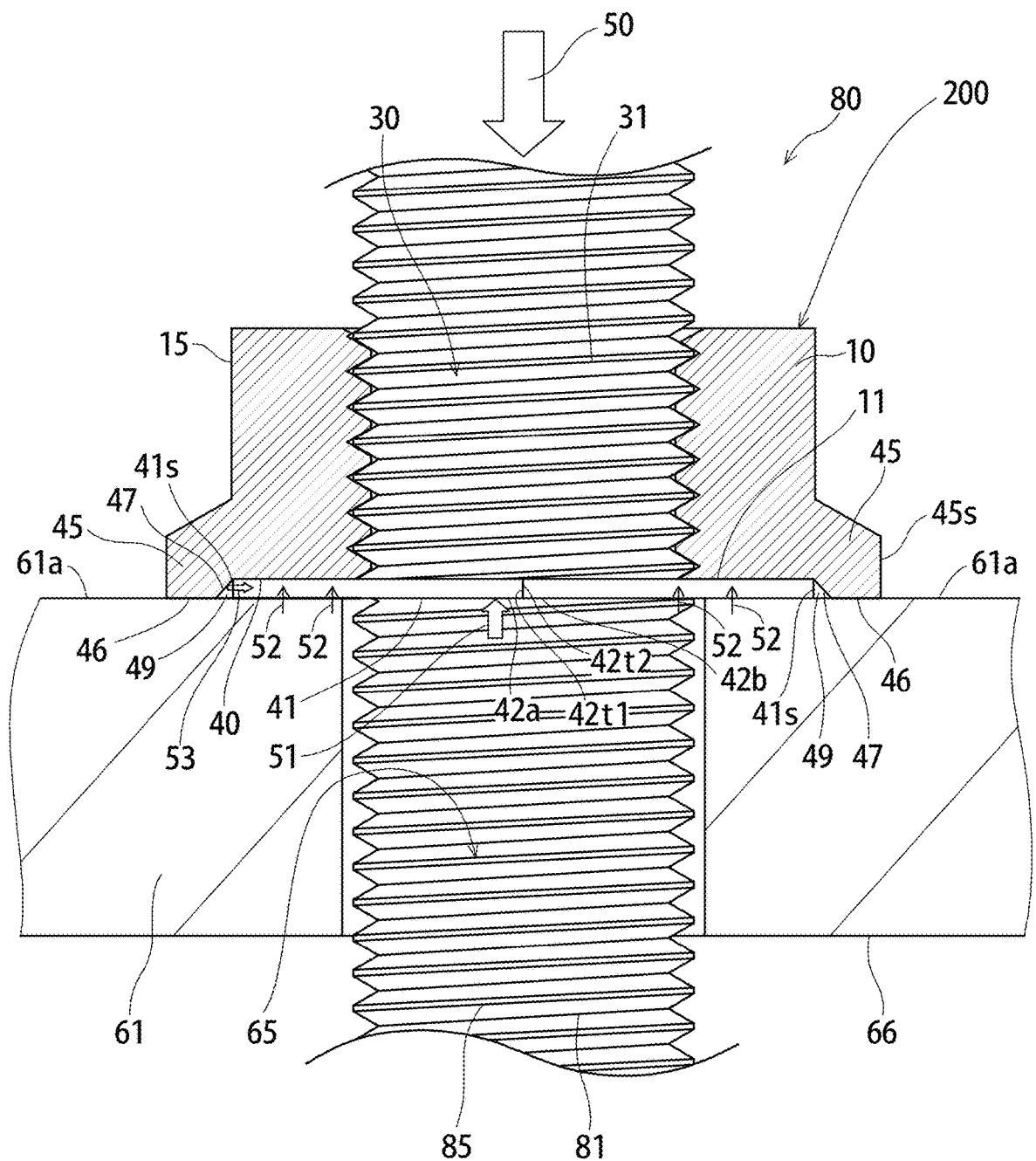
FIG. 12 is an enlarged cross-sectional view provided to describe how tightening is performed by the nut 200.

Now, with reference to FIG. 11 and FIG. 12, a tightening operation of the nut 200 in this embodiment will be described. FIG. 11 is a cross-sectional view showing how the tightening target member 61 and a tightening target member 62 are tightened to each other by the screw shaft 85 and the nut 200. FIG. 12 is an enlarged view of the nut 200 shown in FIG. 11.

As shown in FIG. 11, the tightening target members 61 and 62 are stacked on each other (at a contact plane 66). Both of the members (in this example, plate-like members) 61 and 62 respectively have tapped holes 65 and 67 running therethrough. The screw shaft 85 is inserted into the tapped holes 65 and 67. The nut 200 is set around the screw shaft 85 thus inserted. The nut 200 is rotated so as to advance in a direction of an arrow 50 (downward in the sheet of the figure).

As the nut 200 advances in the direction of the arrow 50, the first end portion 42a of the nut 200 first contacts the tightening target member 61 as shown in FIG. 12. Then, the first end portion 42a is pushed in the direction of the arrow 50, and thus the gap 40 is crushed and becomes smaller. When this occurs, the annular member 41, which has been extended spirally, gradually becomes flat, and a force (arrow 51) pressing the entirety of the annular member 41 becomes stronger. When being pressed, the annular member 41 expands toward an outer edge thereof by the pressing force 51, but is pushed back by the inner wall 47 of the outer frame member 45 (arrow 53). Especially because the inner wall 47 of the outer frame member 45 is inclining (tapering), the force 51 in an upward-downward direction (in the figure, force in an upward direction) applied to the annular member 41 is easily converted into a force in the direction of the arrow 53. The force in the direction of the arrow 53 eliminates the gap 48 between the first end portion 42a and the second end portion 42b, and thus the annular member 41 becomes flat with no gap (obtains a circular annular shape). Since the gap 40 is eliminated, the nut 200 (annular member 41) may be firmly engaged with the threads 81. The nut 200 may be tightened more strongly than a normal nut, but even after being tightened, may absorb an external vibration because of the presence of the gap (second gap) 49. This makes it difficult to loosen the nut 200. In addition, the outer frame member 45 protects the tightening portions (41 and the like), which also makes it difficult to loosen the nut 200.

The above-described tightening operation will be further described with reference to FIG. 13. FIG. 13(a) through FIG. 13(d) show steps of performing tightening by the annular member 41. These figures also show production steps of the tightening structure.

First, as shown in FIG. 13(a), the annular member 41 is set such that the first end portion 41a protrudes downward. The inner wall 47 (especially, the inclining plane) is located around the annular member 41. In this example, a surface 41u of the annular member 41 (top surface in FIG. 8, bottom surface in this figure) is directed downward.

Next, as shown in FIG. 13(b), the first end portion 42a protruding downward is first pushed (arrow 51). As the first end portion 42a is pushed toward the top surface 11, the gap 40 becomes smaller.

Next, as shown in FIG. 13(c), when the first end portion 42a contacts the top surface 11, the entirety of the annular member 41 is pushed (arrows 52), and the side surface 41s of the annular member 41 expands outward. As a reaction (by a reactive force) to the side surface 41s colliding against the inner wall 47, the force in the direction of arrow 53 is generated.

Then, as shown in FIG. 13(d), the gap 48(e) between the first end portion 42a and the second end portion 42b is eliminated, and the annular member 41 with no gap is engaged with the threads 81 more strongly to be tightened. In this manner, strong tightening is provided. Therefore, the nut 200 in this embodiment resists being loosened and is easy to be tightened.

In the example shown in FIG. 13(a) through FIG. 13(d), the top surface 41u of the first end portion 42a, and also a top surface 41u of the second end portion 42b and a top surface u of the extending portion 42c, of the annular member 41 are located at the same plane as that of the top surface 46 of the outer frame member 45. Thus, the contact plane may be increased (maximized). Alternatively to such a structure, a structure may be constructed in which when the nut 200 is tightened, the top surface 41u of the first end portion 42a is located at the same plane as that of the top surface 46 of the outer frame member 45, whereas the top surface 41u of the second end portion 42b is not located at the same plane as that of the top surface 46 of the outer frame member 45, and as a result, the gap 40 is left between the surface of the tightening target member (and the top surface 46 of the outer frame member 45) and the top surface 41u of the second end portion 42b. In the case where the gap 40 is left in this manner, when an impact is applied to the bolt (200), the structure of the annular member 41 and the gap 40 may absorb the impact (external stress), and the absorption may prevent the bolt (200) from being loosened.

According to the structure of this embodiment, the nut 200 includes the annular member 41 formed on the side of the top surface (11) of the nut main body 10 having the tapped hole 30 formed therein and the outer frame member 45 formed on the side of the outer edge of the annular member 41. The first gap 40 is formed between the first end portion 42a of the annular member 41 and the top surface 11 of the nut main body 10, and the second gap 49 is formed between the side surface 41s of the annular member 41 and the inner wall 47 of the outer frame member 45. The top surface 41u of the first end portion 42a of the annular member 41 is located above the top surface 46 of the outer frame member 45. The inner wall 47 of the outer frame member 45 is tapering (in other words, the inner wall 47 is inclining such that the second gap 49 becomes larger in an upward direction).

Therefore, a tightening operation by the nut 200 in this embodiment is performed as follows. The first end portion 42a of the annular member 41 first contacts the tightening target member (61) (in the case of a double-nut structure, contacts the other nut), and the first end portion 42a is pushed to eliminate the first gap 40 (arrow 51). Thus, play provided by the male thread portion and the female thread portion (or the threads and the troughs) is eliminated, and the nut 200 may be firmly engaged with (may firmly lock) the threads 81 of the screw shaft 85. Specifically, since the annular member 41 is inclining in this embodiment, the first end portion 42a, which is a protruding portion among the portions of the annular member 41, first contacts the contact plane (the tightening target member 61, the other nut, or the like), and is deformed by the first gap (slit) 40 being eliminated. Thus, the nut 200 is easily tightened. Especially, the first gap (slit) 40 is eliminated at the time of tightening and thus the annular member 41, which has been inclining, becomes parallel (horizontal) to the contact plane. Therefore, the nut 200 may firmly apply a force to the contact plane easily. At the time of tightening, the top surface 41*u* of the annular member 41 is deformed in such a direction that eliminates the first gap (slit) 40 (mainly deformed in an upward and downward direction). Therefore, the gap (backlash) formed at a position where the female thread portion and the male thread portion are in engagement with each other is eliminated, and the female thread portion (nut) and the male thread portion (bolt) may be put into close contact with each other. A strong frictional force may be provided by the female thread portion (nut) and the male thread portion (bolt). As a result, a situation is certainly prevented in which the nut is loosened from the male thread portion such as a bolt or the like by a vibration or the like and thus the screwing force is decreased.

After the first end portion 42*a* is pushed, the annular member 41 is deformed to expand outward. However, the deformation may be stopped by the inner wall of the outer frame member, and the force is prevented from escaping. In addition, since the inner wall 47 of the outer frame member 45 is tapering (inclining such that the second gap 49 becomes larger in an upward direction), the force that deforms the annular member 41 outward (and the vertical direction force 51) may be favorably adjusted, namely, the reactive force 53 may be favorably used, to prevent the tightening force from escaping. Thus, the tightening may be performed firmly.

Furthermore, the outer frame member 45 may protect the tightening portions (41, 81) against foreign substances that influence the tightening portions (41, 81) and the external force. Therefore, the tightening force of the tightening structure may be certainly protected. In addition, the second gap 49 is formed between the side surface 41*s* of the annular member 41 and the inner wall 47 of the outer frame member 45. Therefore, even if the tightening portions (41, 81) are vibrated, the gap 49 may absorb the influence of the vibration. For this reason also, the tightening force of the tightening structure may be protected more certainly.

In the case where a lock nut (loosening-preventive nut) is to be constructed with a simple structure in which the nut main body 10 has a slit, a slit is formed in the nut main body 10. Such a structure is less strong than a nut with no slit (e.g., a normal nut). By contrast, in the nut 200 in this embodiment, the nut main body 10 does not have a slit but has a gap 40 formed on the side of the top surface (11). A lock nut may be constructed with the annular member 41 using the gap 40. Since the nut main body 10 does not have the slit, the nut 200 in this embodiment has a high strength. In order to realize an equivalent strength, the nut 200 in this embodiment may use a relatively low-cost material and a relatively low-cost production method as compared with a nut with a slit. Therefore, the nut 200 in this embodiment is advantageous in terms of the cost.

Figure 14:
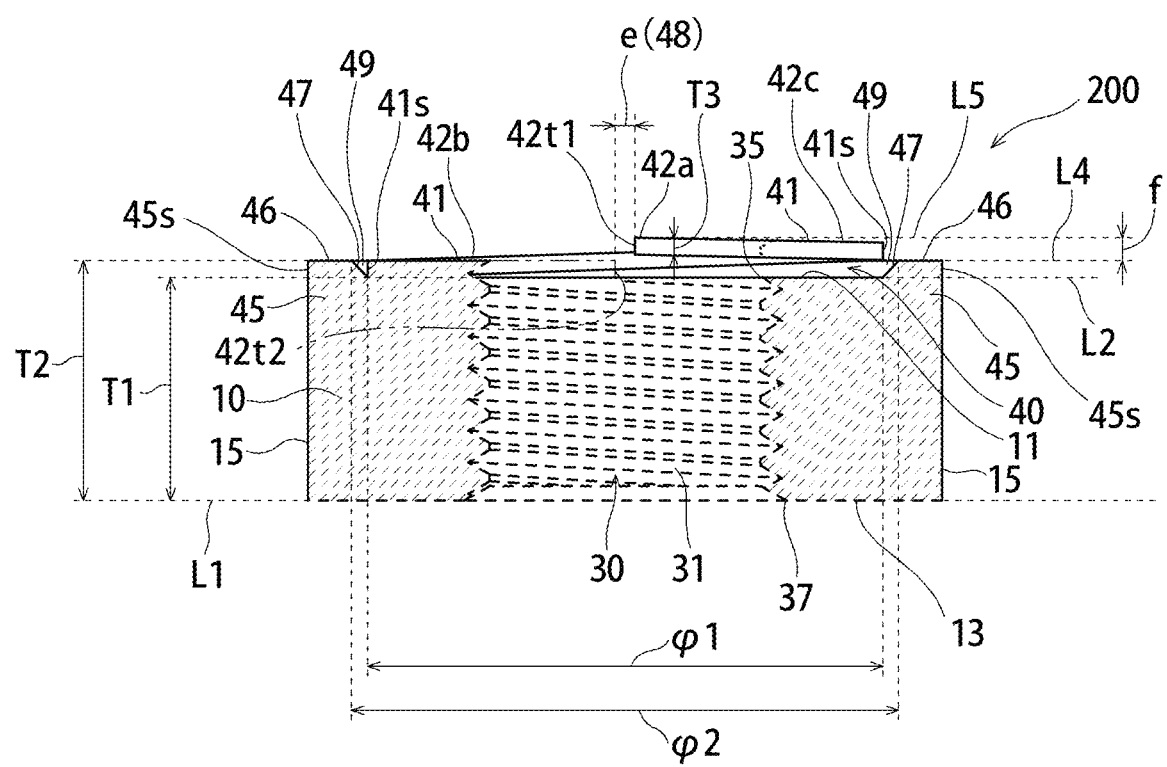
FIG. 14 is a cross-sectional view (front view or side view) provided to describe a structure of a modification of the nut 200.
Figure 15:
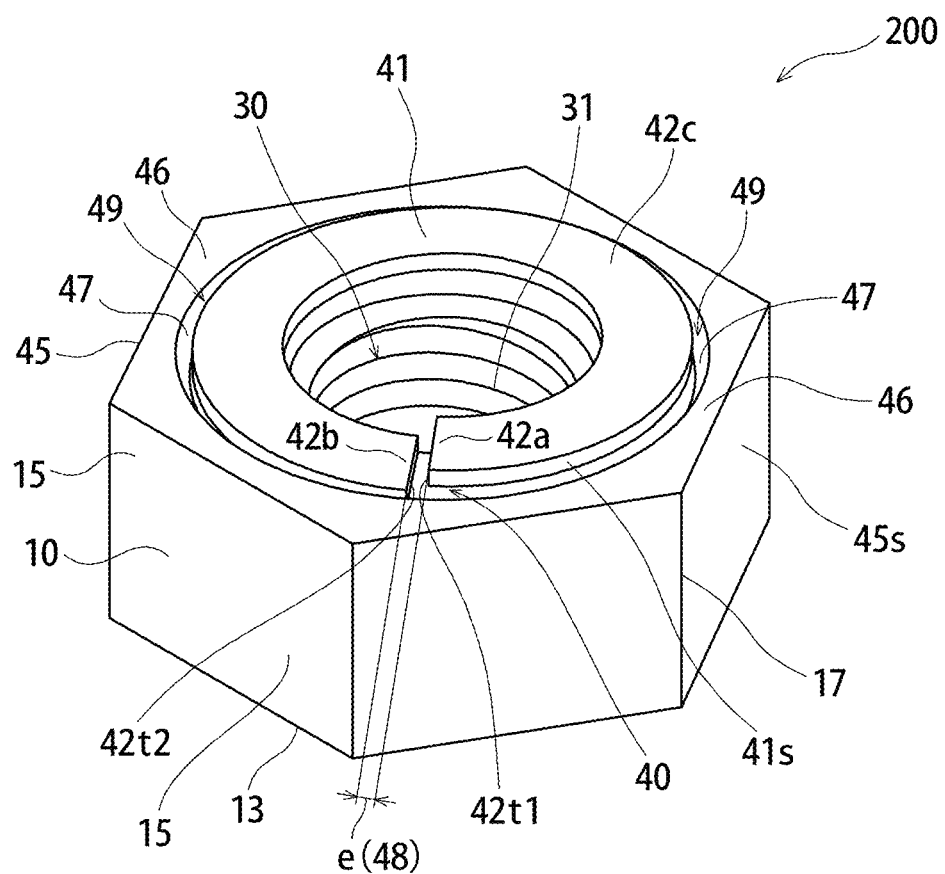
FIG. 15 is a perspective view showing a structure of the modification of the nut 200.

The nut 200 in this embodiment may be modified as shown in FIG. 14 and FIG. 15. FIG. 14 and FIG. 15 are respectively a cross-sectional view and a perspective view showing a modification of the nut 200 in this embodiment.

In the nut 200 shown in FIG. 14 and FIG. 15, the outer frame member 45 is shaped like a polygonal nut (in this example, a hexagonal nut), like the nut main body 10. In other words, outer side surfaces 45*s* of the outer frame member 45 form the same planes as those of the side surfaces 15 of the nut main body 10. According to such a modification, a tool for a hexagonal nut (wrench or the like) may be used relatively freely, which is convenient. Namely, a tool (wrench or the like) of common standards may be used for the side surfaces 15 of the nut main body 10 and also for the outer side surfaces 45*s* of the outer frame member 45, which is convenient. The outer frame member 45 may have a higher strength as compared with in the nut 200 shown in FIG. 8.

Embodiment 2

Figure 16:
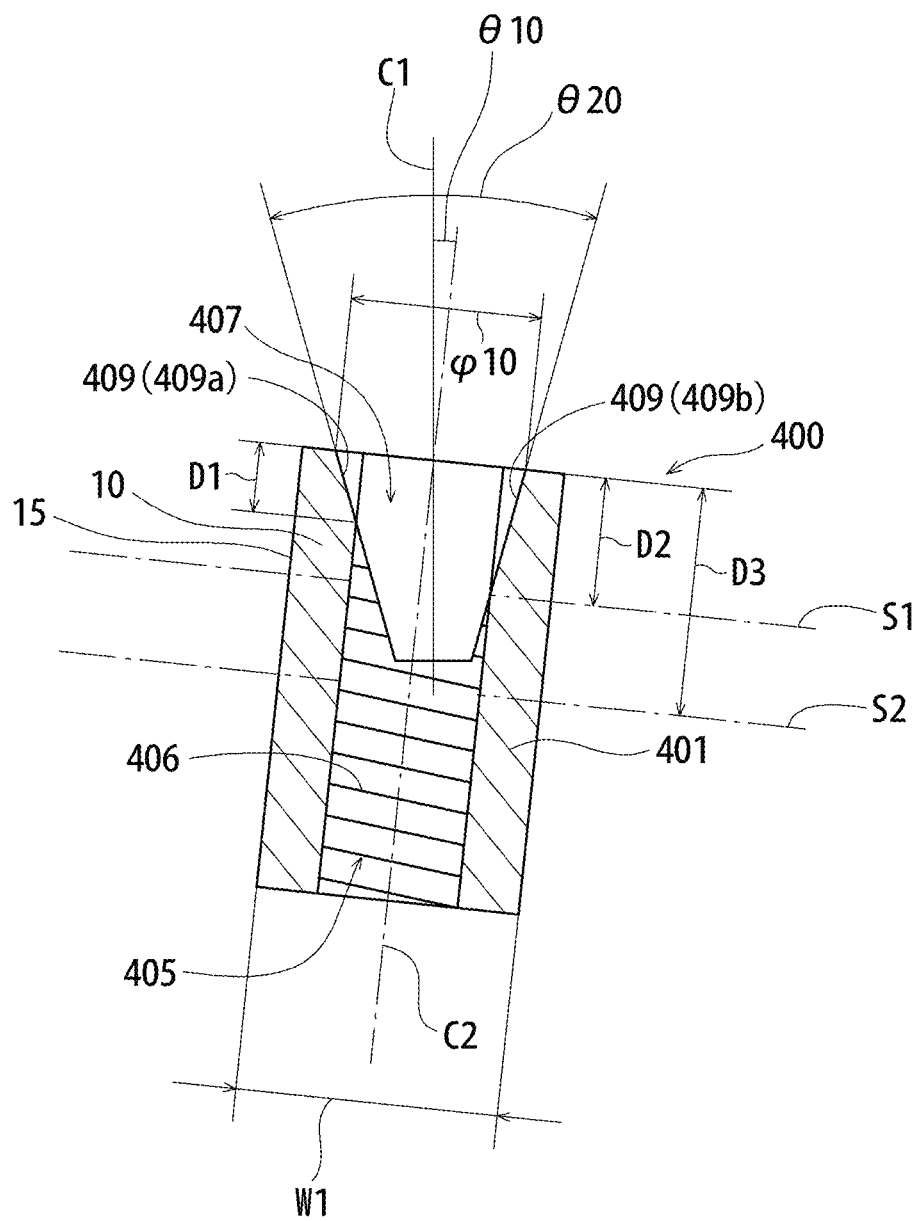
FIG. 16 is a cross-sectional view showing a step of a method for producing a nut 400 according to an embodiment of the present invention.

FIG. 16 is a cross-sectional view provided to describe a method for producing a nut 400 according to embodiment 2 of the present invention. FIG. 17 is a perspective view showing a structure of the nut 400 (female nut) according to this embodiment and a nut 500 (male nut) to be combined with the nut 400. FIG. 18 is a perspective view showing a structure of a pair nut 600 including the nut 400 and the nut 500 in combination. FIG. 19A through FIG. 19D are respectively a perspective view as seen from the bottom side, a side view, a bottom view, and a plan view (top view) of the nut 400.

First, with reference to FIG. 16, a method for producing, and a structure (features) of, the nut 400 according to this embodiment will be described. In FIG. 16, ease of understanding is prioritized, and thus the sizes are not precisely accurate.

The nut 400 in this embodiment has an opening (tapering opening) 409. The opening 409 has an inclining plane (tapering plane) extending from an outer edge of a tapped hole 405 in a state where the nut 400 is inclining with respect to a central axis C2 of a bolt to be used together with the nut 400 (inclining with respect to the vertical direction 99 in FIG. 17) (the nut 400 is inclining such that an angle made by the axis C2 and an axis C1 is θ10).

In the example shown in FIG. 16, a rod member (in this example, a hexagonal column to form a hexagonal nut) 401 has the tapped hole 405 formed therein, and the tapped hole 405 has threads 406 formed thereon. At an end of the rod member 401 having the tapped hole 405 formed therein (in this example, an end surface acting as a bottom surface of the nut 400), an opening 407 having a conical shape (409) is formed. With such a structure, the inclining plane (tapering plane) 409 corresponding to a part of a side surface of the conical shape is formed at an outer edge of the tapped hole 405 in the vicinity of an exit of the tapped hole 405 at the bottom surface of the nut (400). The opening (tapering opening) 407 is enclosed by the inclining plane 409. The tapped hole 405 may be formed after the tapering opening 407 is formed in the rod member 401.

In the structure in this embodiment, the central axis C1 of the conical shape forming the tapering opening 407 is inclining at an angle of θ10 with respect to the central axis C2 of the tapped hole 30 (rod member 401) (the central axis C2 is an axis along the vertical direction 99 as described below). The inclination angle θ10 is, for example, about 4° to about 15° (in a preferred example, 7°, or 7°±3° or the like). The value of the inclination angle θ10 is not limited to any of the above, and may be any preferred value appropriately selected in accordance with the characteristics of the nut 400 to be produced (e.g., use, or numerical values needed in accordance with the tightening state required for the use). θ20 as an angle of the tapering opening 409 is, for example, 20° to 40°, preferably 30° (or, for example, 30°±10°). The value of the angle θ20 is not limited to any of the above, and may be any preferred value appropriately selected in accordance with the characteristics of the nut 400 to be produced (e.g., use, or numerical values needed in accordance with the tightening state required for the use). In the example shown in the figure, the inclining plane 409 is a straight line in a cross-sectional view. Alternatively, the inclining plane 409 may be a curved line in a cross-sectional view. The tapering opening 407 having the conical shape (409) may encompass a tapering opening having an inclining plane that is straight in a cross-sectional view and also a tapering opening having an inclining plane that is curved in a cross-sectional view, namely, a tapering opening having a generally conical shape.

Diameter W1 of the rod member (in the case where the rod member is of a hexagonal column, the diameter of a circumscribed circle thereof) is, for example, 15 mm. It is preferred that diameter W1 is the diameter of the nut typically used. Diameter W1 is not limited to 15 mm, and needless to say, may be of any other value (the value may be provided by inches). In an example, in the case where θ20 is 30° and W1 is 15 mm, depth D1 of the opening (on the shallow side; depth from the end surface to a line reaching the outer edge of the tapped hole 405) is 2 mm to 6 mm (e.g., 2.0 to 2.5 mm, 3.5 mm, 4.9 mm, or the like), and depth D2 of the opening (on the deep side) is 5 mm to 12 mm (e.g., 2.5 mm, 6.8 mm, 10.25 mm). Diameter φ10 of the tapering opening 409 is 8 mm to 12 mm (e.g., 9 mm, 9.4 mm, 10.5 mm, or the like). Height D3 of the nut (400) goes beyond a line S1 at which threads 406 disappear by the tapering opening 409 (reference line for depth D2) and reaches a line S2 extending to a region where the threads 406 are present. It should be noted that even if height D3 is up to the line S1 (reference line for depth D2), the threads 406 are present. Height D3 of the nut (400) may be of a preferred value in accordance with the conditions. In an example, height D3 is 4 mm (in a preferred example, 7 mm or 7 mm±2 mm). In the case where W1 of the nut 400 is not 15 mm, design values may be calculated with reference to the above-mentioned numerical values in accordance with ratios (proportions) of the numerical values.

The angle at which the tapering opening 407 is formed is θ20 (e.g., 30°). Since the axis C1 of the tapering opening 407 is offset from the central axis C2 of the tapped hole (bolt), the angle of an inclining plane 409a on the shallow side (on the side of D1) is more obtuse (closer to the horizontal line) than the angle of an inclining plane 409b on the deep side (on the side of D2). Oppositely describing, the angle of the inclining plane 409b on the deep side (on the side of D2) is closer to the vertical direction (90°) than the angle of the inclining plane 409a on the shallow side (on the side of D1) (the inclining plane 409b is closer to a standing state than the inclining plane 409a). For example, in the case where the angle of the inclining plane 409b on the deep side (on the side of D2) with respect to a tapped hole axis C (or the inner surface of the tapped hole) is about 10°, the angle of the inclining plane 409a on the shallow side (on the side of D1) with respect to the tapped hole axis C (or the inner surface of the tapped hole) is about 20°. As can be seen, both of the angles (angles of the inclining planes 409a and 409b) are not symmetrical, and are different from each other.

The rod member 401 is cut along the line S2, and thus the nut 400 in embodiment 2 is obtained. After the rod member 401 is cut, a new tapering opening 407 is formed in the end surface of the post-cut rod member 401. Then, the rod member 401 is cut at the next line S2. Thus, another nut 400 may be produced. After this, the same process is repeated, and the nuts 400 may be produced (mass-produced).

FIG. 17 shows the nut 400 (female nut) and the nut 500 (male nut) to be used as a pair together with the nut 400. A combination of the nut 400 (female nut) and the nut 500 (male nut) forms the pair nut 600. As shown in FIG. 17, the nut 400 has the tapering opening 407 formed in the bottom surface 13 thereof. The nut 500 includes a protrusion 72 corresponding to the tapering opening 407 of the nut 400.

The protrusion 72 of the nut 500 is inserted into the tapering opening 407 of the nut 400, and thus the pair nut 600 is usable. Hereinafter, the pair nut 600 will be described in more detail.

The pair nut 600 in this embodiment includes the nut 400 (first nut, female nut, top nut) and the nut 500 (second nut, male nut, bottom nut). The nut 400 may be produced as shown in FIG. 16.

The nut 400 in this embodiment includes the nut main body 10 having the tapped hole 30 (corresponding to the "tapped hole 405" in FIG. 16) formed therein. The nut main body 10 has the top surface 11, the side surfaces 15 defining the top surface 11 (side surfaces adjacent to the top surface 11), and the bottom surface 13 located opposite to the top surface 11.

In the structure of this embodiment, the central axis ("C" in FIG. 16) of the tapped hole 30 (405) of the nut 400 matches the central axis (C) of the bolt (80) corresponding to the pair nut 600. In the example shown in the figures, the central axis (C) of the tapped hole 30 (and the bolt) extends in a direction matching the vertical direction 99. The side surfaces 15 of the nut 400 also extend in the vertical direction 99. In the example shown in the figures, the top surface 11 and the bottom surface 13 of the nut 400 extend in the horizontal direction perpendicular to the vertical direction 99.

Figure 19A:
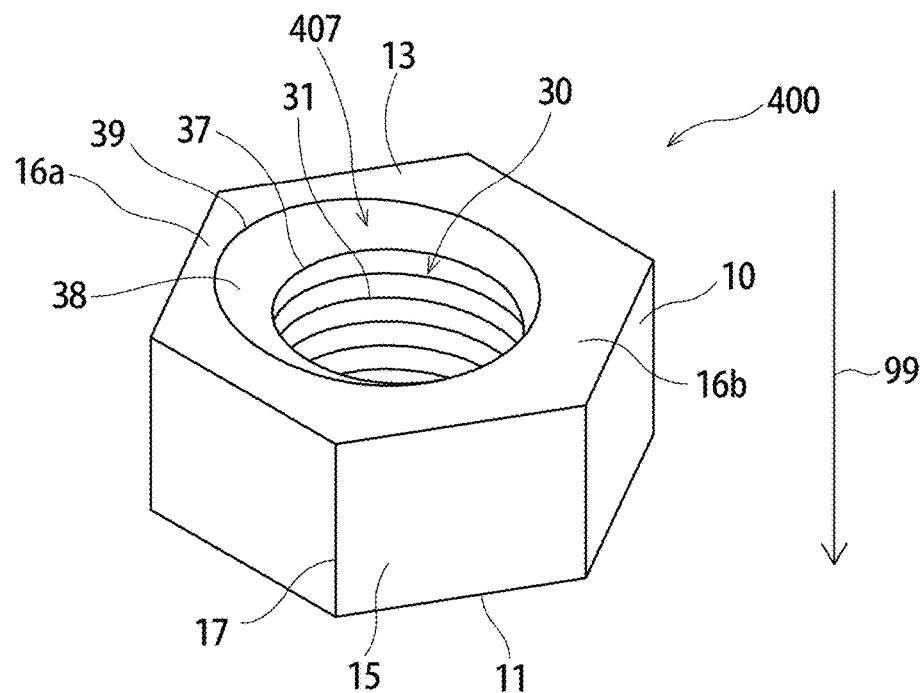
FIG. 19A is a perspective view showing a structure of the nut 400 as seen from the rear side.

As shown in FIG. 19A, in which the bottom (rear) surface is directed upward, the bottom surface 13 of the nut 400 has the bottom opening 407 having a diameter longer than the diameter of the tapped hole 30 (has the tapering opening expanding the diameter of the tapped hole 30) formed therein. No thread 31 is formed in the tapering opening 407. The central axis of the bottom opening 407 ("C2" in FIG. 16) is inclining with respect to the vertical direction 99 (or the central axis C of the tapped hole 30 and the bolt 80) (see "θ10" in FIG. 16). In the example shown in FIG. 19A, the bottom opening (tapering opening) 407 is formed in the bottom surface 13 as being shifted leftward in the sheet of the figure. Therefore, the bottom surface 13 of the nut 400 includes a narrow region 16a (left side) and a wide region 16b (right side) formed because of the bottom opening 407. The bottom surface 13 of the nut 400 has an outer border line 39 of the bottom opening 407, and an inclining plane (tapering plane) 38 is located inner to the outer border line 39. A tapped hole contour (border line) 37 of a bottom end of the tapped hole 30 is located at the bottom of the inclining plane (tapering plane) 38. In the structure of this embodiment, as shown in FIG. 19A, the bottom opening 407 of the nut 400 includes the bottom inclining plane 38 shaped like a cut-out portion of a side surface of a conical shape. The bottom inclining plane 38 is not limited to being shaped like a cut-out portion of a side surface of a conical shape in a geometrical sense, and may be shaped like an inclining plane of another tapering shape. It should be noted that because a portion is often processed (cut out) by a rotation machine during the production of the nut 400, it is preferred that the bottom inclining plane 38 is a part of a side surface of a rotatable body.

Figure 19B:
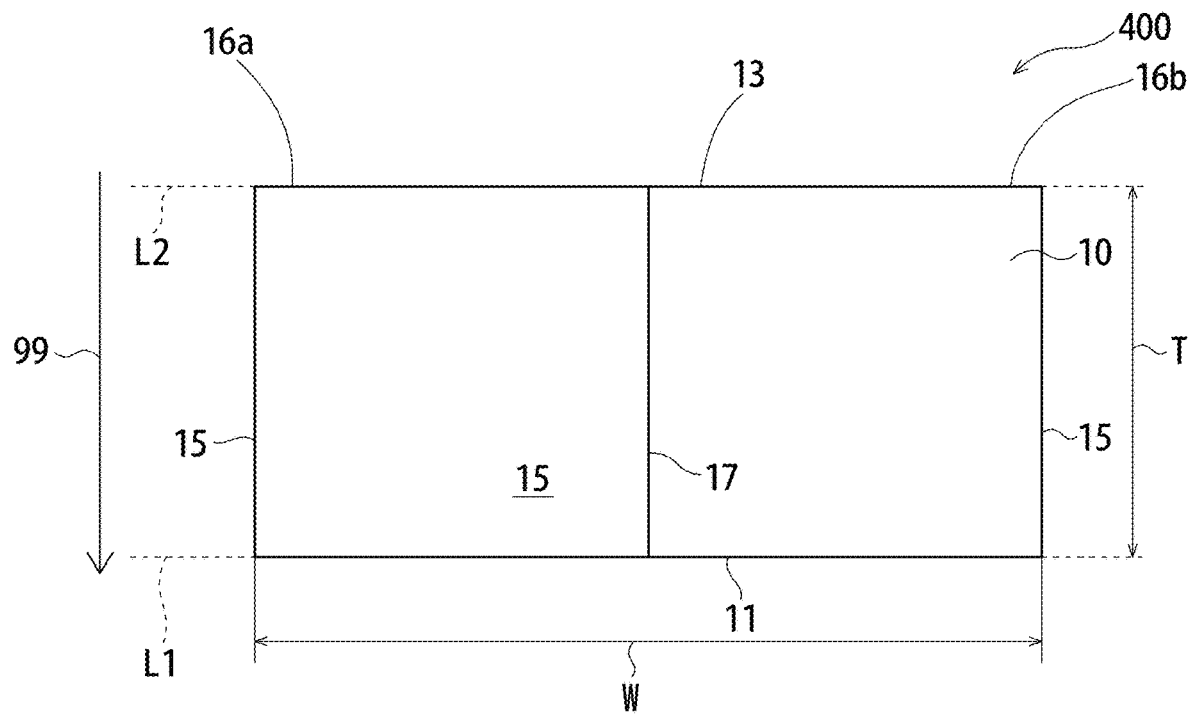
FIG. 19B is a side view showing a structure of the nut 400.
Figure 19C:
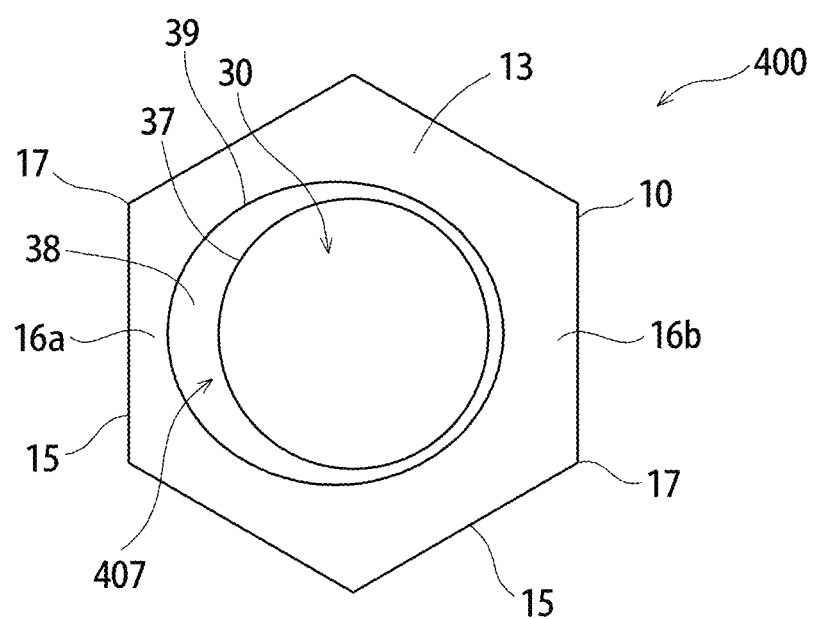
FIG. 19C is a bottom view showing a structure of the nut 400.
Figure 19D:
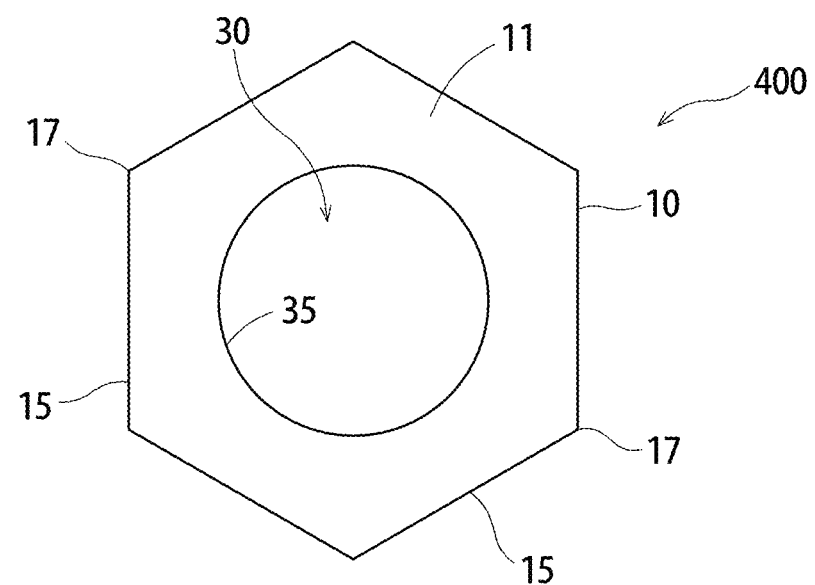
FIG. 19D is a plan view (top view) showing a structure of the nut 400.

FIG. 19B shows the side surfaces of the nut 400 shown in FIG. 19A. FIG. 19C is a bottom view of the nut 400 shown in FIG. 19A. FIG. 19D is a plan view (top view) of the nut 400.

The nut 500 (male nut) shown in FIG. 17 includes the nut main body 10 having the tapped hole 30 formed therein. The nut main body 10 of the nut 500 has a top surface 73, side surfaces 15 defining the top surface 73 (side surfaces adjacent to the top surface 73), and a bottom surface 75 located opposite to the top surface 73. The top protrusion 72 corresponding to the bottom opening 407 of the nut 400 is formed on the top surface 73 of the nut 500. The expression that the top protrusion 72 corresponds to the bottom opening 407 of the nut 400 does not indicate that the top protrusion 72 has the same shape as that of the bottom opening 407, but indicates that when the nut 400 and the nut 500 are tightened to each other, the top protrusion 72 is inserted into the bottom opening 407 and thus the top protrusion 72 and the bottom opening 407 may be in close contact with each other. The tapped hole 30 of the nut main body 10 is formed also in the top protrusion 72. The tapped hole 30 is commonly formed in the top protrusion 72 and the nut main body 10, and the tapped hole 30 in the nut main body 10 extends to a top surface 71 of the top protrusion 72 and runs through the nut main body 10 and the top protrusion 72. In the structure of this embodiment, the top protrusion 72 and the nut main body 10 of the nut 500 are integrally formed.

The central axis of the tapped hole 30 formed in the top protrusion 72 and the nut main body 10 matches the central axis (C) of the bolt (80) corresponding to the pair nut 600.

In this example, the central axis (C) is along the vertical direction 99. In the structure of this embodiment, the tapped hole 30 has an equal diameter in the nut 500 and the nut 400 (e.g., 8 mm). The central axis (C2) of the tapped hole 30 is common to the nut 500 and the nut 400, and is along the vertical direction (99).

An outer side surface of the top protrusion 72 of the nut 500 may be a vertical surface extending perpendicularly from the top surface 73 of the nut main body 10 (or a vertical surface extending in the vertical direction 99). In the structure of this embodiment, the outer side surface of the top protrusion 72 is an inclining plane (tapering plane). Since the outer side surface of the top protrusion 72 is slightly inclining (at, for example, 3° to 20 or 10°±5° with respect to the vertical direction 99), the top protrusion 72 of the nut 500 may be easily inserted into the bottom opening (tapering opening) 407 of the nut 400. A height of the top protrusion 72 of the nut 500 (distance, in the vertical direction 99, between the top surface 71 and the top surface 73) may be any preferred height appropriately selected in accordance with the shape (depth or the like) of the bottom opening 407 of the nut 400 to be combined with the nut 500. The top protrusion 72 shown here has a truncated conical shape three-dimensionally. In the structure of this embodiment, the top protrusion 72 has a height of, for example, 2 mm to 8 mm (preferably 3 mm to 5 mm). The top surface 71 of the top protrusion 72 has a circular annular shape, and has an outer diameter of, for example, 9 mm to 10 mm. Alternatively, any preferred outer diameter may be appropriately selected.

When the top protrusion 72 of the nut 500 is put into contact with the bottom opening 407 of the nut 400, a state shown in FIG. 18 is provided. Before the pair nut 600 (nuts 400 and 500) in this embodiment is tightened to the bolt (80), a gap 610 is formed between the nut 400 and the nut 500 as shown in FIG. 18. Specifically, when the top protrusion 72 of the nut 500 is merely inserted into, and put into contact with, the bottom opening 407 of the nut 400, the gap 610 is present between the bottom surface 13 of the nut 400 and the top surface 73 of the nut 500. In the structure of this embodiment, the gap 610 has a length of, for example, about 0.5 mm to about 3 mm (preferably 1 to 2 mm).

When the pair nut 600 (nuts 400 and 500) is inserted into, and firmly tightened to, the bolt (80) (namely, when the nut 400 and the nut 500 are tightened so as to be in close contact with each other), the bottom surface 13 of the nut 400 and the top surface 73 of the nut 500 contact each other. Specifically, when the pair nut 600 is tightened to the bolt, the top protrusion 72 of the nut 500 firmly advances deep into the bottom opening 407 of the nut 400. Thus, the nut 400 and the nut 500 are strongly secured to each other, and the gap 610 is eliminated (the length of the gap 610 becomes 0 mm).

In the structure of the pair nut 600 shown in FIG. 18, a film (in this example, resin film) 650 is provided around the side surfaces 15 of the nut 400 and the side surfaces 15 of the nut 500 to secure the nut 400 and the nut 500. The resin film 650 in this embodiment is a shrink film, namely, an annular resin film (encompassing a film formed to be annular by bonding of end surfaces) that is shrinkable by heat. The shrink film 650 is formed of a resin material that is shrinkable by heat, for example, polyvinylchloride (PVC), polystyrene (PS), polyethyleneterephthalate (PET), polypropylene (PP), polyolefin (PO) or the like.

In the structure of this embodiment, the resin film (shrink film) 650 is formed to cover the entire circumference of the side surfaces 15 of the nut 400 and the side surfaces 15 of the nut 500 to close the gap 610. Specifically, the shrink film 650, which has an annular shape having a diameter slightly longer than the diameter of each of the nut 400 and the nut 500, is put on the side surfaces 15 including the gap 610, and is shrunk in this state. Thus, the shrink film 650 is put into close contact with the side surfaces 15 and may secure the nut 400 and the nut 500 to each other. The shrink film 650 may be formed to cover the entirety of the side surfaces 15 or to expose a part of the side surfaces 15 (in this example, a top region of the nut 400 and a bottom region of the nut 500) as shown in FIG. 18. In either case, the shrink film 650 may be formed on the side surfaces 15. Alternatively, the shrink film 650 may cover the entirety of the side surfaces 15 and also a part of the shrink film 650 may cover an outer peripheral region of the top surface 11 of the nut 400 (and/or an outer peripheral region of the bottom surface 75 of the nut 500).

In the structure of this embodiment, the nut 400 and the nut 500 are the same polygonal nuts (in this example, hexagonal nuts), and the side surfaces 15 of both of the nuts (400 and 500) are along the vertical direction 99. The nut 400 and the nut 500 have the same axis (C2) of the tapped hole. Namely, the pair nut 600 has the common shaft (C2). Therefore, the nut 400 and the nut 500 secured to each other by the shrink film 650 (pair nut 600) may be outserted in this state to the shaft of the bolt. Namely, it is not needed to outsert the nut 400 and the nut 500 separately (it is not needed to perform the outserting operation twice), but the pair nut 600 may be outserted to the shaft of the bolt by one outserting operation. This may significantly improve the working efficiency (since merely one outserting operation is needed instead of two outserting operations, the efficiency becomes twice as high), which is very convenient.

The resin film (shrink film) 650 covers the side surfaces 15 of the nut 400 and the nut 500. Therefore, there is an advantage that the side surfaces 15 may be protected by the resin film 650. The resin film 650 closes the gap 610, and thus may prevent the gap 610 from being contaminated with foreign substances (encompassing stain, ink, and the like), which is also convenient. In the case where the pair nut 600 is firmly tightened, the nut 400 and the nut 500 are in close contact with each other, whereas the resin film (shrink film) 650 is broken and detached. Therefore, the post-process is easily performed. If the resin film 650 is not broken, this demonstrates that the pair nut 600 is not firmly tightened. This has a technological value from the point of view of inspecting the tightening state. When the pair nut 600 is tightened, the shrink film 650, which is thin, is broken and detached. Nonetheless, a cut (dotted line) may be formed in the shrink film 650 so as to allow the shrink film 650 to be detached easily. In this embodiment, the resin film 650 is a shrink film that is shrunk by heat. The effect of tightening the pair nut 600 itself is provided even without the resin film 650, and the above-described effect (protection or the like) may be provided by winding a resin film that is not shrunk by heat around the side surfaces, instead of using the shrink film.

The stacking state of the nut 400 and the nut 500 (state shown in FIG. 18) may be constructed by an adhesive or the like with no use of the resin film 650. However, it is preferred to use the shrink film 650 in consideration of the technological and economical issues regarding the production and/or the tightening of the pair nut 600. The technique of securing two nuts with a shrink film 650 is not limited to being used for the nut 400 and the nut 500 in this embodiment, and may be adapted for other nuts (e.g., a combination of two (or a plurality of) nuts, namely, a nut of a typical shape and a nut of a special shape, a combination of two typical nuts (e.g., a plurality of (two) nuts (3100) shown in FIG. 5)), or a plurality of (or two) nuts (3100 and/or 3000)). It is preferred that such two nuts have a common shaft of the tapped hole from the point of view of outserting the two nuts to the bolt in one outserting operation, with no consideration of the surface protection function of the pair nut).

Figure 20A:
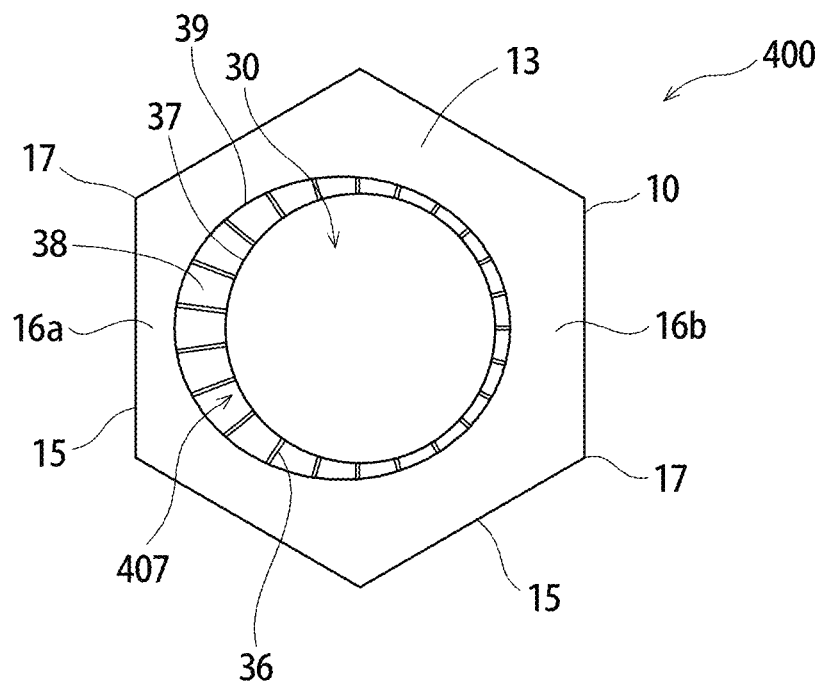
FIG. 20A is a bottom view showing a structure of a modification of the nut 400.
Figure 20B:
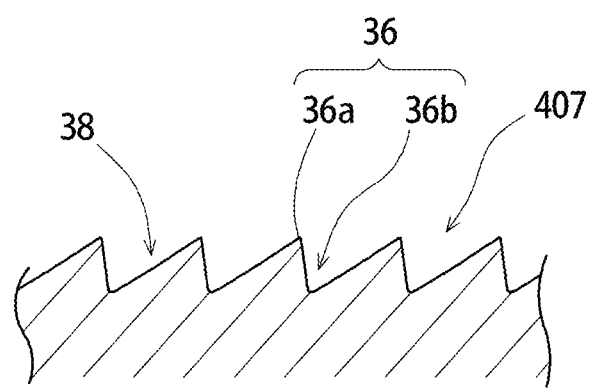
FIG. 20B is a cross-sectional view schematically showing a structure of grooves 36.

The nut 400 in this embodiment may be modified as shown in FIG. 20A. FIG. 20A shows a structure of a bottom surface of the modification of the nut 400. In the nut 400 shown in FIG. 20A, the bottom inclining plane (tapering plane) 38 has grooves 36 formed therein. In the structure of this embodiment, a plurality of grooves 36 are formed to extend radially in a surface of the bottom inclining plane 38. The grooves 36 provide steps (e.g., of 1 mm or less) at the surface of the bottom inclining plane 38. FIG. 20B schematically shows a cross-sectional structure of the grooves 36. The grooves 36 are formed so as not to act as a resistive component in a direction in which the nut 400 is tightened (forward direction in the tightening direction) but so as to act as a resistive component in a direction in which the nut 400 is disengaged (opposite direction to the tightening direction). The grooves 36 shown in FIG. 20B have a sawtooth-like (or triangular) cross-sectional shape, and each include a peak 36a and a concaved portion 36b. Use of the nut 400 (female nut) shown in FIG. 18 for the pair nut 600 in this embodiment may further improve the tightening force. Specifically, convexed portion are formed on the side surface of the top protrusion 72 of the nut 500 (male nut) shown in FIG. 17, and the convexed portions of the nut 500 and the grooves 36 of the nut 400 (female nut) are put into engagement with each other. In this manner, the force that removes the tightening force may be stopped by the grooves 36, and release of the pair nut 600 from the tightened state may be suppressed.

Figure 21:
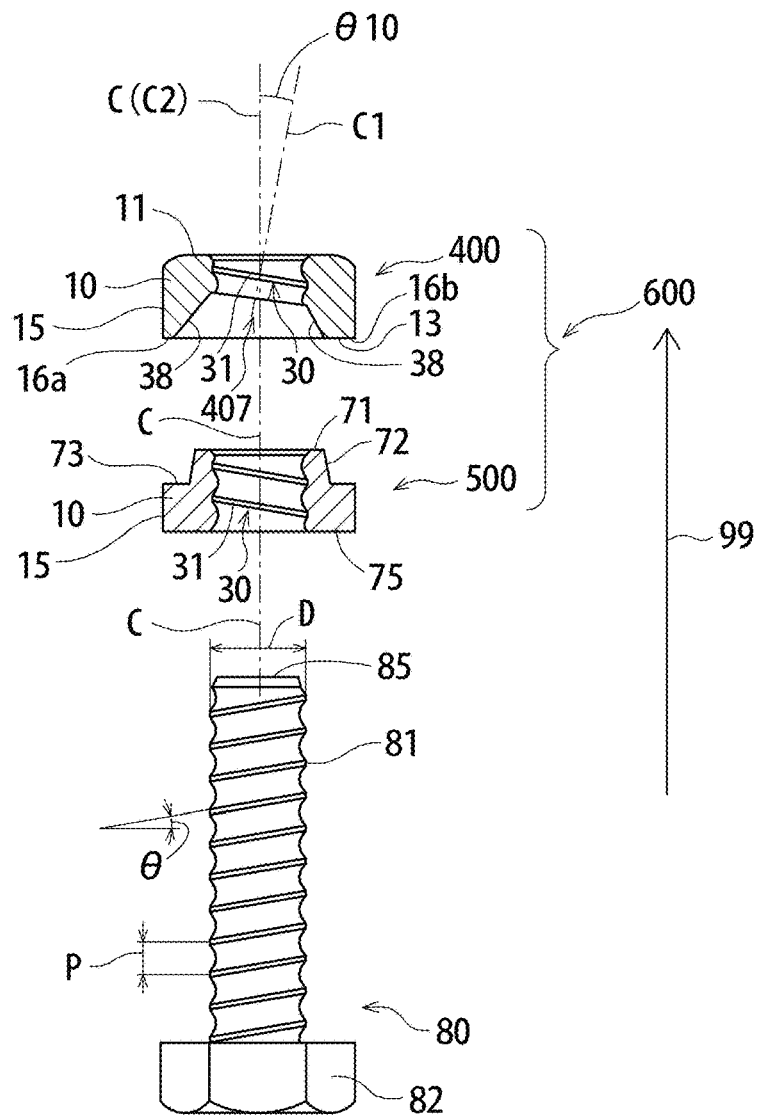
FIG. 21 is an exploded view (cross-sectional view) showing how the pair nut 600 is tightened to the bolt 80.

Now, with reference to FIGS. 21 and 22, how the pair nut 600 (nuts 400 and 500) in this embodiment is tightened to the bolt 80 will be described. FIG. 21 shows the nut 400 and the nut 500 in an exploded state, and shows that the central axis C of the tapped hole 30 of the nut 400, the central axis C of the tapped hole 30 of the nut 500, and the central axis C of the screw shaft 85 of the bolt 80 match each other. In this example, the central axes C extend in a direction matching the vertical direction 99. The tapped hole 30 of the pair nut 600 (nuts 400 and 500) corresponds to the screw shaft 85 of the bolt 80 in terms of the outer diameter D and the pitch P (and the helical angle θ).

Figure 22:
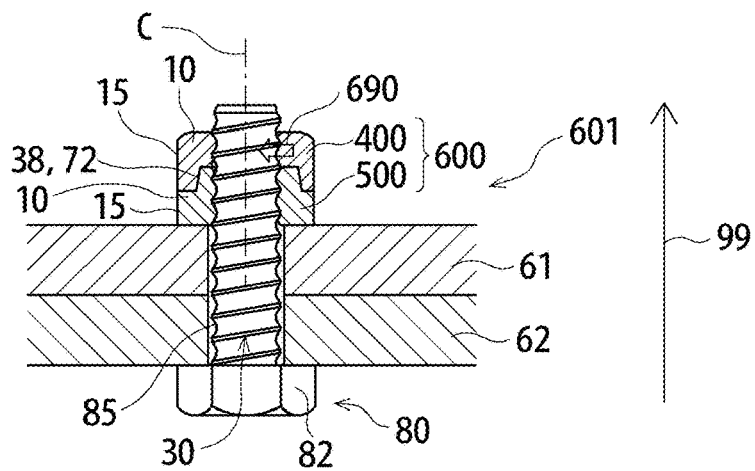
FIG. 22 is a cross-sectional view showing a structure of a tightening structure 601 tightened by the pair nut 600 and the bolt 80.

As shown in FIG. 22, the nut 400 and the nut 500 are stacked on each other to form the pair nut 600. When the tightening target members 61 and 62 are tightened by the screw shaft 85 and the pair nut 600 as shown in FIG. 22, a tightening structure 601 is formed. When the nut 400 and the nut 500 are firmly tightened to the tightening target member 61 (62) as shown in FIG. 22, the top protrusion 72 of the nut 500 contacts the inclining plane 38 of the bottom opening 407 of the nut 400. The inclination angle of the inclining plane 38 of the nut 400 is different between the narrow region 16a and the wide region 16b (namely, the inclination angle of the right region of the inclining plane 38 and the inclination angle of the left region of the inclining plane 38 are different from each other). Therefore, the top protrusion 72 in contact with the inclining plane 38 is displaced in an oblique direction. When the pair nut 600 is tightened strongly in this state, the top protrusion 72 is inserted deep into the bottom opening 407 of the nut 400, and the nut 400 is strongly pressed toward the tightening target member 61 (62). Therefore, a horizontal direction force (in a direction of an arrow 690) is applied to the pair nut 600, and the force (690) increases the tightening force. This may eliminate the gap (backlash) formed at a position where the female thread portion and the male thread portion are in engagement with each other and put the female thread portion (nut) and the male thread portion (bolt) into close contact with each other. Thus, a strong frictional force may be provided by the female thread portion (nut) and the male thread portion (bolt). As a result, a situation is certainly prevented in which the nut is loosened from the male thread portion such as a bolt or the like by a vibration or the like and thus the screwing force is decreased.

As shown in FIG. 22, the nut 400 and the nut 500 are integrated together by the tip (protrusion) 72 of the nut 500 deeply eating into the rear surface of the nut 400. The pair nut 600 in this embodiment has a higher strength than a combination of two typical nuts (having a top surface and a bottom surface that are parallel to each other and planar). In the structure of this embodiment, the bottom surface 75 of the nut 500 and the bottom surface 13 of the nut 400 are parallel to each other (perpendicular to the vertical direction 99). Therefore, in the tightening state shown in FIG. 22, the bottom surface 75 of the nut 500 and the bottom surface 13 of the nut 400 are both parallel to a surface (top plane, horizontal plane) of the tightening target member 61, and thus the tightening target members 61 and 62 may be firmly secured. From the tightening state shown in FIG. 22, the nut 400 and the nut 500 may be disengaged by a spanner.

Figure 1:
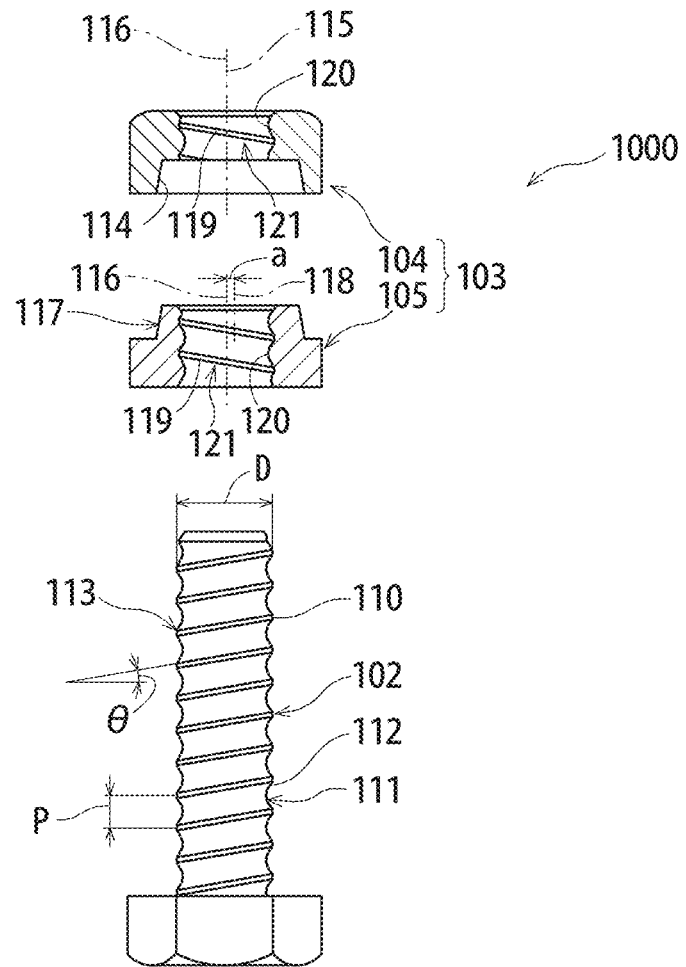
FIG. 1 is an exploded view showing a structure of a conventional hard lock nut 103.
Figure 2:
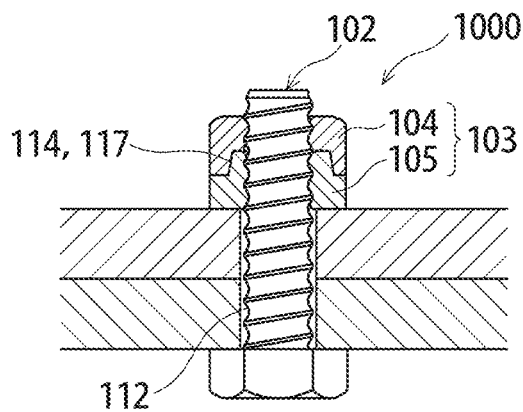
FIG. 2 is a cross-sectional view showing a structure of a tightening structure 1000 including the conventional hard lock nut 103.
Figure 3:
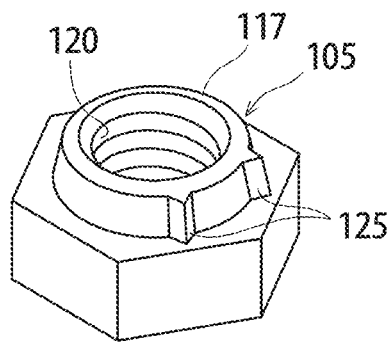
FIG. 3 is a perspective view showing an improved bottom nut 105 for the conventional hard lock nut.
Figure 4:
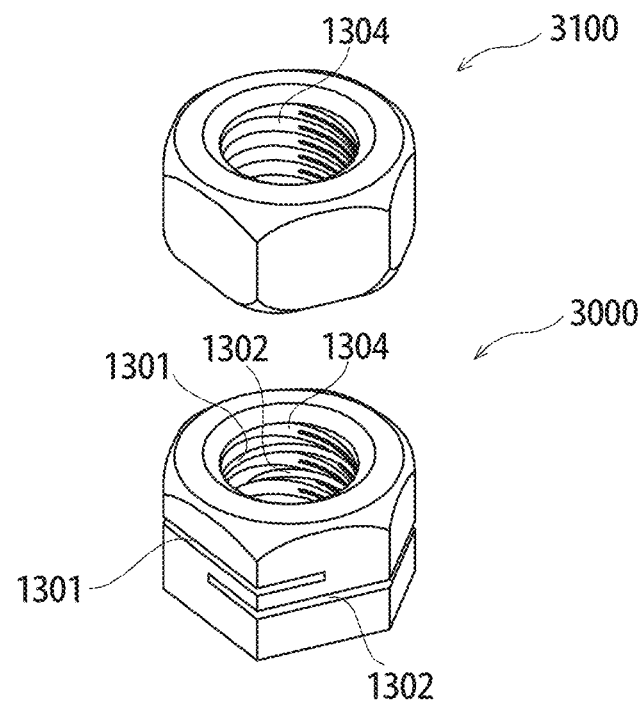
FIG. 4 is a perspective view showing a structure of a normal nut 3100 and a conventional lock nut 3000.

The pair nut 600 in this embodiment has the following advantages over the hard lock nut 103 shown in FIG. 1 and FIG. 2. First, in the hard lock nut 103 shown in FIG. 1, the tapped hole axis of the top nut 104 and the tapped hole axis of the bottom nut 105 are shifted from each other (see the distance (a) of eccentricity). Therefore, the top nut 104 and the bottom nut 105 cannot be outserted together to the bolt 102. After the bottom nut 105 is outserted, while being rotated, to the bolt, the top nut 104 needs to be outserted, while being rotated, to the bolt 102. This is troublesome. The nut 400 and the nut 500 of the pair nut 600 in this embodiment have a common tapped hole axis (C), and therefore, may be outserted to the bolt 80 in one outserting operation. In the case of being integrated with the shrink film 650 shown in FIG. 18, the pair nut 600 is easier to be handled. The two nuts (400 and 500) may be outserted as one nut 600, while being rotated, to the bolt 80 at the same time in a simple manner. Even merely for this reason, the attaching efficiency of the pair nut 600 in this embodiment is twice as high as the attaching efficiency of the hard lock nut 103. In addition, the nut 400 and the nut 500 provide a force (action) to bend the screw shaft 85 in the direction of the arrow 690. Therefore, there is also an effect that the (slight) bending of the screw shaft 85 makes it difficult for the nut 400 and/or the nut 500 to be disengaged from the screw shaft 85. By contrast, the hard lock nut 103 is secured by a wedge force (action), but does not act to bend the screw shaft. Therefore, there is a disadvantage that once the top nut 104 is disengaged from the screw shaft, the securing force of the bottom nut 105 is significantly decreased.

In the hard lock nut 103 shown in FIG. 1 and FIG. 2, the axis 118 of the truncated cone-shaped fitting portion 117 of the bottom nut 105 is shifted. Therefore, one side (to which the axis is shifted by the distance (a)) of the truncated cone-shaped fitting portion 117, which is thinner than the nut main body, has the thickness thereof further decreased. In the hard lock nut 103, this thin portion is used to provide a wedge action for distortion.

Therefore, the stress is concentrated to the thin portion, and the thin portion is easy to be broken. By contrast, the pair nut 600 in this embodiment does not include such a thin portion, and therefore, has an advantage of being less easy to be broken than the hard lock nut 103. As shown in FIG. 17, the top surface 71 of the protrusion 72 of the nut 500 has a uniform thickness and does not have a thin portion. Since the pair nut 600 is inclining with respect to the bolt shaft 85, the stress is not easily concentrated, as compared with the hard lock nut 103, in which the stress is easily concentrated to the thin portion. Therefore, the pair nut 600 in this embodiment may decrease the breakage ratio.

As described above, in the pair nut 600 in this embodiment, the central axis C (C2) of the tapped hole 30 of the first nut (female nut) 400 and the second nut (male nut) 500 matches the central axis (C) of the bolt. In the bottom surface 13 of the first nut 400, the bottom opening 407 is formed. The central axis C1 of the bottom opening 407 extends while inclining (at an angle of θ10) from the central axis C of the bolt. On the top surface 73 of the second nut 500, the top protrusion 72 is formed. Therefore, when the top protrusion 72 of the second nut 500 is inserted into the bottom opening 407 of the first nut 400 to tighten the first nut 400 and the second nut 500 to each other, the top surface 71 of the top protrusion 72 of the second nut 500 contacts the bottom opening 407 of the first nut 400 non-uniformly (with one side being prioritized), instead of uniformly, because the central axis C of the bottom opening 407 of the first nut 400 extends while inclining (θ10). Therefore, the second nut 500 first enters the bottom opening 407 of the first nut 400 while slightly inclining. This generates a force of a lateral component (arrow 609), which may eliminate the gap (backlash) formed at a position where the female thread portion (nuts 400 and 500) and the male thread portion (bolt 80) are in engagement with each other, and put the female thread portion (nuts 400 and 500) and the male thread portion (bolt 80) into close contact with each other. As a result, the female thread portion (nuts 400 and 500) and the male thread portion (bolt 80) may provide a strong frictional force, and thus a situation is certainly prevented in which the nut (600) is loosened from the male thread portion such as the bolt 80 or the like by a vibration or the like and thus the screwing force is decreased. For putting the top surface 71 of the top protrusion 72 of the second nut 500 into contact with the bottom opening 407 non-uniformly (with one side being prioritized), another structure may be adopted. In the pair nut 600 in which the central axis C (C2) of the tapped hole 30 of the first nut 400 and the second nut 500 matches the central axis C of the bolt, the top surface 73 of the nut main body 10 of the second nut 500 may be inclining. With such a structure, in a state where the first nut 400 and the second nut 500 are tightened to each other, when the inclining top surface 73 of the second nut 500 contacts the bottom surface 13 of the first nut 400, the top protrusion 72 of the second nut 500 inclines. Therefore, the top surface 71 of the top protrusion 72 may contact the bottom opening 407 non-uniformly (with one side being prioritized). As a result, a force of a lateral component (arrow 609) is generated, which may eliminate the gap (backlash) formed at a position where the female thread portion (nuts 400 and 500) and the male thread portion (bolt 80) are in engagement with each other, and put the female thread portion (nuts 400 and 500) and the male thread portion (bolt 80) into close contact with each other. In the structure in which the top surface 73 of the nut main body 10 of the second nut 500 is inclining, even when the inclination angle (θ10) of the bottom opening 407 of the first nut 400 is 0°, the top surface 71 of the top protrusion 72 of the second nut 500 may be put into contact with the bottom opening 407 non-uniformly. In the structure in which the top protrusion 72 of the second nut 500 extends while inclining with respect to the central axis C, even when the inclination angle (θ10) of the bottom opening 407 of the first nut 400 is 0°, the top surface 71 of the top protrusion 72 of the second nut 500 may be put into contact with the bottom opening 407 non-uniformly.

As described above, the central axis C (C2) of the tapped hole 30 of the first nut 400 and the second nut 500 matches the central axis C of the bolt. Therefore, the first nut 400 and the second nut 500 are easier to be produced as compared with the first nut and the second nut that do not have a matching central axes C (nuts 104 and 105 shown in FIG. 1). Namely, the hard lock nut 103 (104, 105) shown in FIG. 1 has a special structure that may realize eccentric fitting, and thus has a problem of requiring higher production cost (or higher purchase cost) than a normal nut. The pair nut 600 (400, 500) in this embodiment has an advantage of being available at low production cost (or low purchase cost).

In addition, the central axis C of the tapped hole 30 of the pair nut 600 (the first nut 400 and the second nut 500) in this embodiment matches the central axis C of the bolt. Therefore, the first nut 400 and the second nut 500 may be stacked on each other and outserted to the bolt 80 by one operation (rotating operation), which is convenient. The hard lock nut 103 (104, 105) shown in FIG. 1 has a special structure that that may realize eccentric fitting, and thus the central axes of the nuts 104 and 105 do not match each other. This requires the first nut and the second nut (104 and 105) to be outserted to the bolt by different operations (rotating operations), which is twice troublesome. The pair nut 600 (400 and 500) in this embodiment may have an attaching efficiency to the bolt 80 that is significantly higher than (at least twice as high as) that of the hard lock nut 103 (104 and 105).

Embodiment 3

Figure 23:
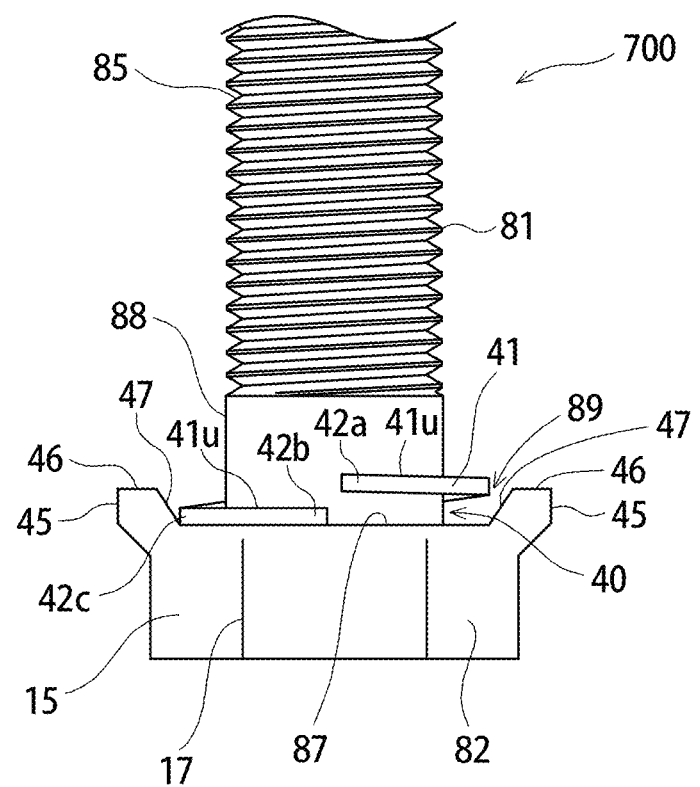
FIG. 23 shows a structure of a bolt 700 according to an embodiment of the present invention.

Now, with reference to FIG. 23, a bolt 700 according to embodiment 3 of the present invention will be described. FIG. 23 schematically shows a base portion of the bolt shaft 85 of the bolt 700 in this embodiment. For easier understanding, FIG. 23 includes a front view of the base portion of the bolt shaft 85 and a front view of a bottom portion of a bolt head 82 (portion including the side surfaces 15 and the borders 17). The outer frame member 45 located around the base portion of the bolt shaft 85 is shown with no hatching, which represents a cross-sectional view, in order to show the features of the entirety of embodiment 3 in an easy-to-understand manner.

The bolt 700 in this embodiment includes the bolt shaft 85 having threads 81 formed on at least a part thereof and the bolt head 82 formed at an end of the bolt shaft 85. In the structure of this embodiment, the bolt shaft 85 includes a no-thread portion 88 with no threads between the portion in which the threads 81 are formed and the bolt head 82.

In the structure of this embodiment, the bolt head 82 has a bolt base opening 89 formed in a portion close to the bolt shaft 85. A washer 41 is outserted to the bolt shaft 85 to be in bolt base opening 89. Specifically, the bolt shaft 85 is inserted into an central opening of the washer 41, which is generally annular, and a main body of the washer 41 (42a, 42b, 42c) is accommodated in the bolt base opening 89.

The washer 41 in this embodiment includes the first end portion 42a, the second end portion 42b and the extending portion 42c between the first end portion 42a and the second end portion 42b. The washer 41 shown in the figure has a spiral shape wound around the bolt shaft 85 once, and has a spring function. The first end portion 42a is located at a level higher than that of the second end portion 42b. There is a gap between the first end portion 42a and the second end portion 42b.

In the structure of this embodiment, in a state where the bolt 700 is not tightened, the second end portion 42b of the washer 41 is in contact with a bottom surface 87 of the bolt base opening 89. A gap 40 is formed between the first end portion 42a of the washer 41 and the bottom surface 87 of the bolt base opening 89. In this state, the washer 41 is accommodated in the bolt base opening 89.

The outer frame member 45 defining the bolt base opening 89 is formed outer to the bolt base opening 89 accommodating the washer 41. The inner wall 47 of the outer frame member 45 is inclining while tapering in an upward direction. A part (side surface) of the extending portion 42c of the washer 41 may be in contact with the inner wall 47 of the outer frame member 45.

In a state where the bolt 700 is not tightened, the top surface 41u of the first end portion 42a of the washer 41 is located above the top surface 46 of the outer frame member 45. The top surface 41u of the first end portion 42a of the washer 41 is located below the top surface 46 of the outer frame member 45.

The bolt 700 in embodiment 3 is basically operated as the mechanism described with reference to FIG. 12 and FIG. 13 and has a strong tightening force. Specifically, the outer frame member 45 and the annular member (circular annular member) 41 of the nut 200 in the above-described embodiment correspond to the outer frame member 45 and the washer 41 of the bolt 700 in this embodiment. Substantially the same descriptions would be repetitive and thus will be omitted for easier understanding.

The bolt 700 having the structure shown in FIG. 23 is, when being tightened, like the bolt 80 tightening the tightening target members 61 and 62 as shown in FIG. 22. The structure shown in FIG. 23 (the bolt base opening 89, the washer 41, and the outer frame member 45) is formed at the base of the bolt shaft 85, the base being in the vicinity of the bolt head 82 of the bolt 80 shown in FIG. 22. In FIG. 23, the outer frame member 45 protrudes from outer surfaces (side surfaces 15) of the bolt head 82. Alternatively, the outer frame member 45 may be flush with the outer surfaces (side surfaces 15) of the bolt head 82. In other words, the bolt base opening 89 may be formed in a central region (base region) of the bolt head 82 shown in FIG. 22, and the washer 41 may be accommodated in the bolt base opening 89.

Figure 13:
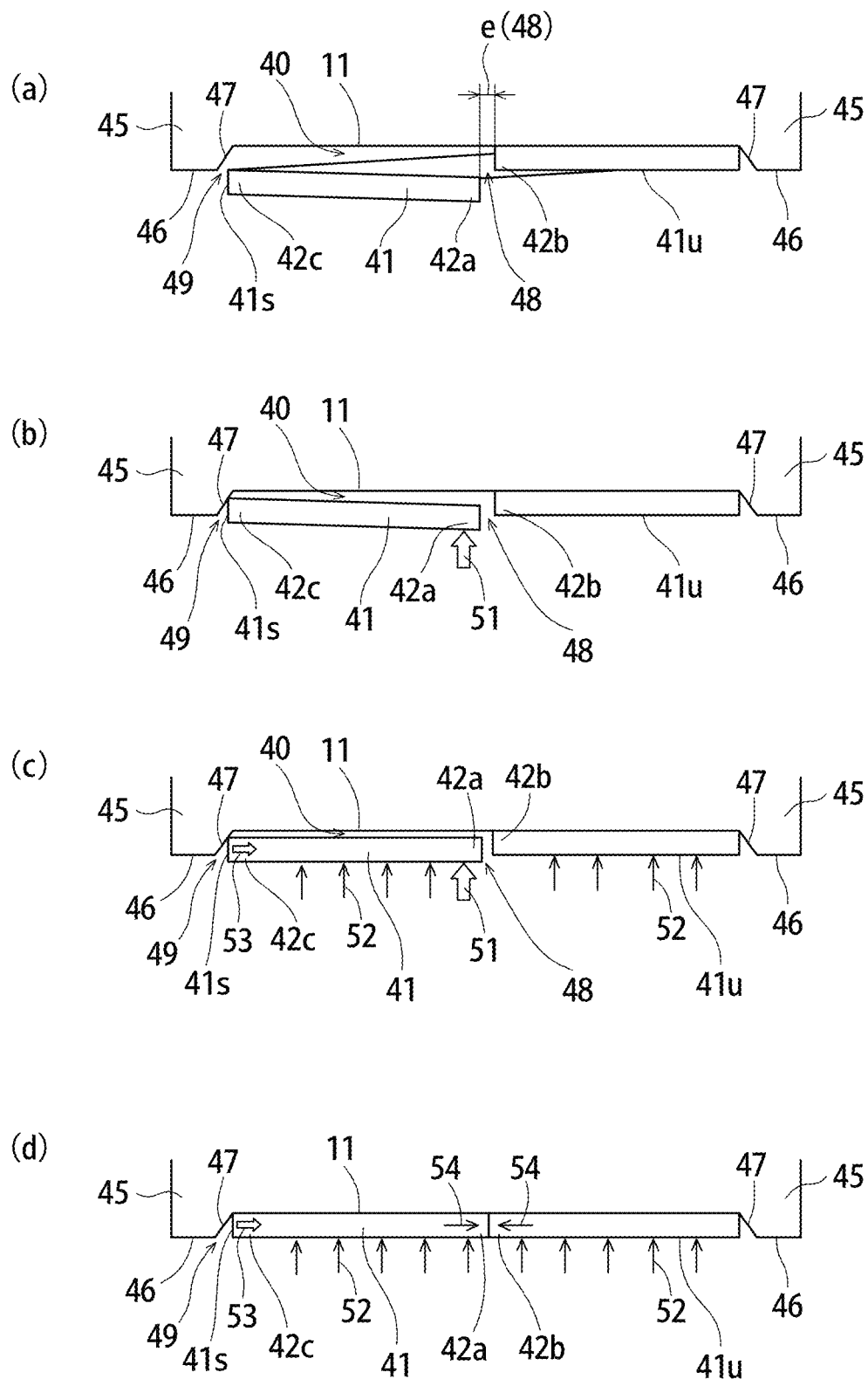
FIG. 13(a) through FIG. 13(d) show steps of performing tightening by an annular member 41.

Based on the description in the above embodiment made with reference to FIG. 12 and FIG. 13, when the bolt 700 is tightened, the top surface 41u of the first end portion 42a of the washer 41 is at the same plane as that of the top surface 46 of the outer frame member 45. In addition, the top surface 41u of the second end portion 42b and the top surface u of the extending portion 42c of the washer 41, as well as the top surface 41u of the first end portion 42a, are located at the same plane as that of the top surface 46 of the outer frame member 45. Alternatively to such a structure, a structure may be constructed in which when the bolt 700 is tightened, the top surface 41u of the first end portion 42a is located at the same plane as that of the top surface 46 of the outer frame member 45, whereas the top surface 41u of the second end portion 42b is not located at the same plane as that of the top surface 46 of the outer frame member 45, and as a result, the gap 40 is left between the surface of the tightening target member 62 (and the top surface 46 of the outer frame member 45) and the top surface 41u of the second end portion 42b. In the case where the gap 40 is left in this manner, when an impact is applied to the bolt 700, the structure of the washer 41 and the gap 40 may absorb the impact (external stress), and the absorption may prevent the bolt 700 from being loosened. In FIG. 23, the configuration of (positional relationship between) the top surface 41u of the washer 41 and the top surface 46 of the outer frame member 45 is set so as to provide the above-described structure. As described regarding the structure of the above-described embodiment (FIG. 12, FIG. 13, etc.), the configuration having such features may be adopted for the structure of the above-described embodiment (FIG. 12, FIG. 13, etc.). Needless to say, the top surface 46 of the outer frame member 45 and the top surfaces 41u of all the portions of the washer 41 may be at the same plane as each other. In this case, there is an advantage that the joining surface area is enlarged (maximized) and the tightening force is increased.

In the structure shown in FIG. 23 (and FIG. 22), the washer 41 may be located on the bottom surface 87 of the bolt base opening 89 by a gravitational force. However, the bolt 700 may be used while being put upside down or laterally. Therefore, it is preferred that a part of the washer 41 (especially, the second end portion 42b and the vicinity thereof) is attached to the bottom surface 87 of the bolt base opening 89. The part of the washer 41 may be attached to the bottom surface 87 of the bolt base opening 89 by, for example, an adhesive, a pressure-sensitive adhesive, a magnet or the like. Alternatively, for example, a method of attaching by welding, a method of integrally forming the washer 41 and the bottom surface 87, and the like may be used.

Figure 24A:
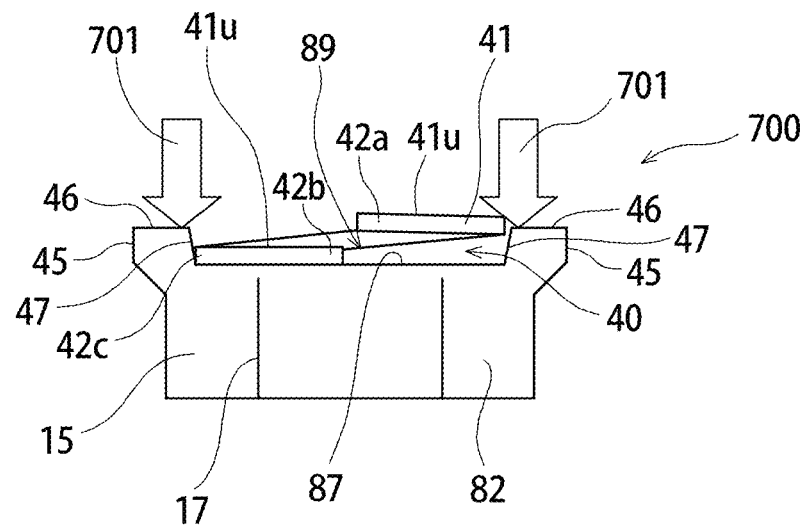
FIG. 24A shows a structure of a modification of the bolt 700.
Figure 24B:
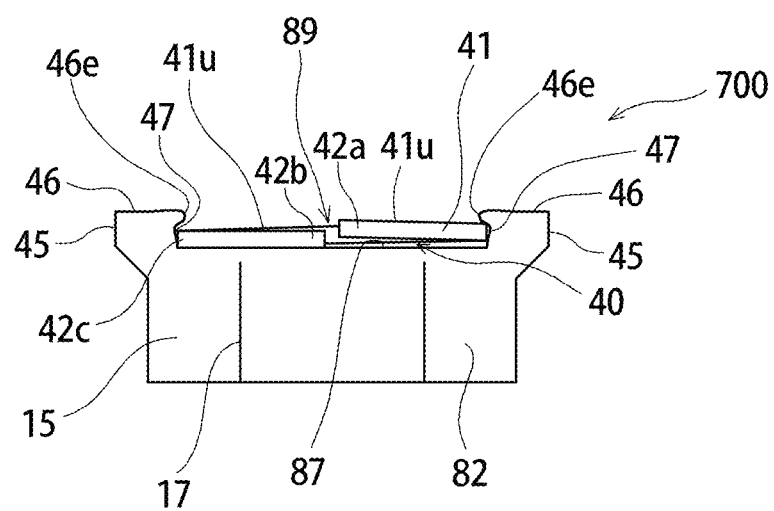
FIG. 24B shows a structure of the modification of the bolt 700.

The bolt 700 may be modified as shown in FIG. 24A and FIG. 24B. FIG. 24A mainly shows a structure of the bolt head 82 (especially, the bolt base opening 89, the washer 41, and the outer frame member 45) of the bolt 700 shown in FIG. 23. When an external force 701 is applied to the top surface 46 of the outer frame member 45 (specifically, when the top surface 46 is hit by a tool (e.g., hammer)), the bolt 700 becomes as shown in FIG. 24B.

In the structure shown in FIG. 24B, an extending portion (protrusion) 46e is formed on the top surface 46 of the outer frame member 45, and the extending portion (protrusion) 46e may press the washer 41. In more detail, when the top surface 46 of the outer frame member 45 is hit, a part of the top surface 46 extends toward the bolt base opening 89 (inward) to become the extending portion (protrusion) 46e.

In this structure, the extending portion 46e may press the top surface 41u of the washer 41. Therefore, even if the bolt 700 is put upside down, the washer 41 does not come off, which is convenient. Namely, in the structure shown in FIG. 24B, the washer 41 may be used in a favorable manner with no need to attach the washer 41 to the bottom surface 87 of the bolt base opening 89 by welding (or adhesion or the like).

In the structure shown in FIG. 24B, even when the bolt 700 is firmly tightened, the gap 40 is left between the washer 41 and the bottom surface 87 of the bolt base opening 89. The gap 40 acts as a cushion to increase a tightening keeping force. In FIG. 24A and FIG. 24B, the wall plane (inner wall) 47 of the bolt base opening 89 is inclining. Alternatively, the wall plane (inner wall) 47 may be vertical. It should be noted that in the case where the wall plane (inner wall) 47 is inclining, a reaction force to the pressing of the inclining plane 47 by the washer 41 may be used to increase the tightening force. In addition, the structure (action, production method) shown in FIG. 24A and FIG. 24B is applicable to a nut (especially, the nut 200) as well as to the bolt 700. Similarly, the structure shown in FIG. 24B is applicable to the operation shown in FIG. 13(a) through FIG. 13(d). In the structure of this embodiment, the inner wall of the central opening of the washer 41 does not have screw grooves formed therein. Alternatively, a structure in which the inner wall of the central opening of the washer 41 has screw grooves formed therein may be adopted.

Figure 25A:
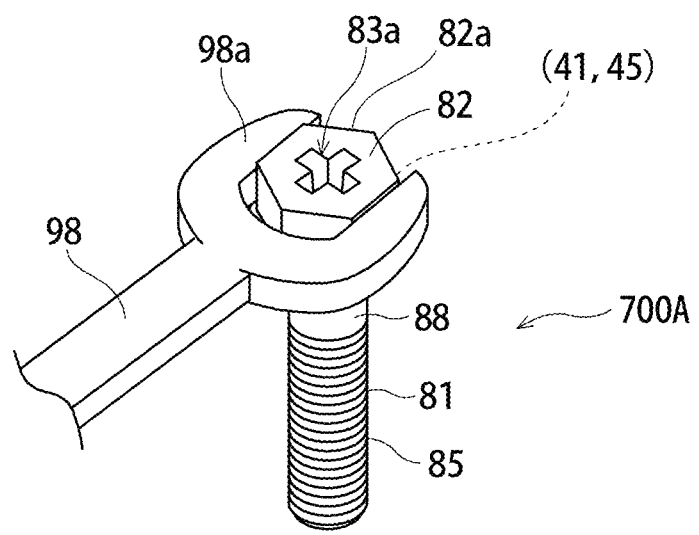
FIG. 25A is a perspective view showing a structure of a bolt head 82 of a bolt 700A.

FIG. 25A is a perspective view provided to describe the bolt head 82 of a bolt 700A in an embodiment. The bolt head 82 of the bolt 700A shown in FIG. 25A has a polygonal head shape 82a (shape of a hexagonal head, shape of a hexagonal nut). The bolt 700A may be tightened by the bolt head 82 being held by a jaw 98a of a spanner 98. The bolt head 82 includes the washer 41, the outer frame member 45 and the like described above in a portion thereof close to the bolt shaft 85. The bolt head 82 of the bolt 700A has a driver groove 83a (the groove 83 is a cross slot in this example, but may be a coin slot) formed therein.

Figure 25B:
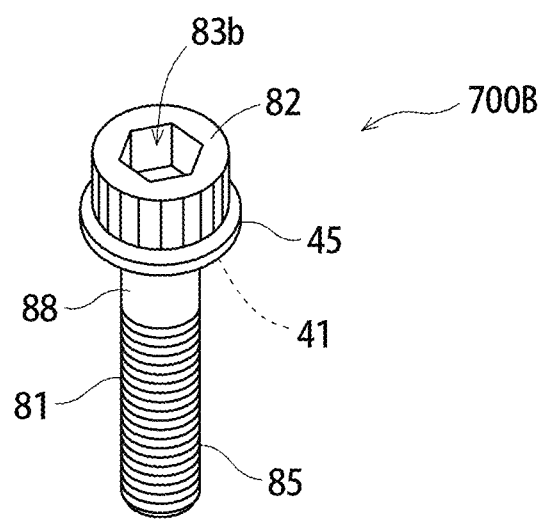
FIG. 25B is a perspective view showing a structure of a bolt head 82 of a bolt 700B.

FIG. 25B is a perspective view provided to describe the bolt head 82 of a bolt 700B in an embodiment. The bolt head 82 of the bolt 700B has a wrench socket 83b (the wrench socket 83b is a hexagonal opening in this example, but may be an opening of any other shape) formed therein. The bolt head 82 of the bolt 700B may be circular (instead of being hexagonal) as shown in the figure. Alternatively, the bolt head 82 may be polygonal (82a) as shown in FIG. 25A.

The present invention has been described by way of preferred embodiments. The above description is not limiting the present invention, and may be modified in any of various manners, needless to say. For example, in the above embodiments, the nut (200, etc.) is hexagonal. The features of the present invention are applicable to a nut of any other shape (e.g., a square nut or a pentagonal nut). A nut having a reverse screw structure (200, etc.)

may be constructed instead of a nut of a forward screw structure. In the case of the forward screw structure, it is preferred that in FIG. 14, the first end portion 42a is located on the right side in the sheet of the figure. In the case of the reverse screw structure, the first end portion 42a is located on the left side in the sheet of the figure. The numbers of the above embodiments (embodiment 1, 2, 3, etc.) are provided for the sake of convenience, and the features of each of the embodiments may be applicable to the other embodiments as long as there is no contradiction. Specifically, the structure of the pair nut 600 shown in FIG. 17 and FIG. 18 is not prohibited from adopting the structure of inclining the top surface 11 (or the bottom surface 13) of the nut main body 10 and/or the structure of the slit 20. It should be noted that in the case where such a structure is actually applied, it is preferred to adopt a preferred design (size, structure).

In a modification of a nut according to an embodiment of the present invention, in the case where the nut main body 10 having a slit needs to have elasticity of a spring or the like (in other words, in the case where the slit 20 is crushed and is difficult to be restored), it may be preferred to compress the nut main body 10 in advance. Such a process may be performed. As described above, a predetermined portion of the nut main body 10 may be chamfered, or a structure that, for example, increases the strength (or a structure that decreases the amount or the weight of the materials) may be added.

The nut (200, etc.) and/or the bolt 700 according to an embodiment of the present invention is usable for any of various uses. Specifically, the nut and/or the bolt is usable for bridges; engines, transmissions and devices therefor of buses, trucks and passenger vehicles; various types of tube plugs (or tightening tools for the structures) in thermal power plants and nuclear power plants; rails, overhead cables and devices therefor; papermaking and ironworks machines; chemical plants; elevators and escalators; railroad vehicles and railroad tracks; structures in tunnels; steel towers; civil engineering machines; structures for freeways (noise barriers, signboard, etc.); compressors and pumps; machine tools; automatic warehouses and transportation devices; engines and devices therefor of marine vessels and aircrafts; and the like. A tightening structure (or a structure) using the nut 200 or the like and the bolt 700 or the like for any of these uses is also a product according to the present invention.

INDUSTRIAL APPLICABILITY

The present invention may provide a novel lock nut (especially, a nut that resists from being loosened and also is easy to be tightened).

DESCRIPTION OF REFERENCE SIGNS

10 Nut main body
11 Top surface of the nut main body
13 Bottom surface of the nut main body
15 Side surface of the nut main body
30 Tapped hole
35 Contour of the tapped hole on the top surface
36 Groove
36a Peak
36b Concaved portion
37 Tapped hole contour on the bottom surface
38 Bottom inclining plane (tapering inclining plane)
39 Outer border line of the tapering inclining plane
40 Gap
41 Annular member (washer)
41s Side surface of the annular member
41u Surface (top surface) of the annular member
42a First end portion
42b Second end portion
42c Extending portion (annular extending portion)
45 Outer frame member
45s Outer side surface of the outer frame member
46 Top surface of the outer frame member
46e Extending portion of the top surface
47 Inner wall (inclining plane) of the outer frame member
48 Gap (e)
49 Gap (second gap)

60 Pair nut
61, 62 Tightening target member
63 Opening
65, 67 Tapped hole
66 Contact plane
69 Tightening target member
70 Tightening structure
72 Protrusion (top protrusion)
73 Top surface of the nut main body
75 Bottom surface of the nut main body
80 Bolt
81 Thread
82 Bolt head
83a Driver groove
83b Wrench socket
85 Screw shaft (bolt shaft)
87 Bottom surface of the bolt head
88 No-thread portion
89 Bolt base opening
90 Nut
91 Contact plane
98 Spanner
98a Jaw
99 Vertical direction
102 Bolt
103 Hard lock nut
104 Top nut
105 Bottom nut
106 Tapped hole center
110 Peak
111 Trough
112 Concaved plane
114 Tapering fitting recess
115 Axis
116 Tapped hole center
117 Truncated cone-shaped fitting portion
118 Axis
119 Trough
120 Arcked convexed plane
121 Thread
125 Protrusion
200 Nut
400 Nut
401 Rod member
405 Tapped hole
406 Thread
407 Bottom opening
500 Nut
600 Pair nut
601 Tightening structure
605 Shrink film
610 Gap
650 Resin film (shrink film)
700 Bolt
1000 Tightening structure
3000, 3100 Nut
4000, 4100 Nut
5000, 5100 Nut

The invention claimed is:

1. A nut, comprising:
a nut main body having top surface;
a tapped hole within the nut main body, the tapped hole being oriented about an axial center of the nut main body;
an annular member adjacent to the top surface of the nut main body, the annular member including a first end portion and a second end portion, the first end portion being located opposite to the second end portion and the second end portion being in contact with the top surface of the nut main body; and
an outer frame member adjacent to a side surface of the annular member, wherein
a top surface of the annular member at the first end portion is located above a top surface of the annular member at the second end portion,
a first gap exists between the annular member at the first end portion and the top surface of the nut main body, and
upon the nut being tightened, the first gap exists between the annular member at the first end portion and the top surface of the nut main body.

2. The nut according to claim 1, wherein:
the outer frame member has an inner wall extending between a top surface of the outer frame member and the top surface of the nut main body, the inner wall inclining while tapering between the top surface of the outer frame member and the top surface of the nut main body, and
a second gap exists between the side surface of the annular member and the inner wall.

3. The nut according to claim 2, wherein:
the nut main body a polygonal nut,
the annular member has a circular annular shape having an opening, the opening corresponding to the tapped hole,
a third gap exists between an end surface of the first end portion and an end surface of the second end portion of the annular member, and
the second gap at the top surface of the outer frame member is larger than the second gap at the top surface of the nut main body.

4. The nut according to claim 1, wherein upon the nut being tightened, the side surface of the annular member is in contact with an inner wall of the outer frame member.

5. The nut according to claim 1, wherein upon the nut being tightened, the top surface of the annular member at the first end portion is level with a top surface of the outer frame member.

6. The nut according to claim 1, wherein:
the outer frame member includes a top surface, a portion of the top surface of the outer frame member extending towards the axial center of the nut main body, and
the portion of the top surface of the outer frame member extending towards the axial center of the nut main body presses the top surface of the annular member.

7. The nut according to claim 1, wherein:
the nut main body is a polygonal nut, and
an outer side surface of the outer frame member is configured to be continuous with a side surface of the nut main body along a plane.

8. The nut according to claim 1, wherein the nut main body, the annular member and the outer frame member are integrally molded.

9. The nut according to claim 1, wherein:
the top surface of the nut main body and a top surface of the outer frame member are oriented in a horizontal direction perpendicular to a vertical direction, and
the annular member has a structure extending spirally upward in the vertical direction from the second end portion.

10. The nut according to claim 1, wherein an inner wall of a central opening of the annular member has a screw groove, the screw groove corresponding to the tapped hole of the nut main body.

11. A bolt, comprising:
a bolt shaft having a thread portion on at least a portion thereof; and
a bolt head formed at an end of the bolt shaft,
wherein:
the bolt head has a bolt base opening formed in a portion close to the bolt shaft,
a washer is inserted into the bolt base opening,
the washer includes a first end portion, a second end portion and an extending portion between the first end portion and the second end portion,
in a state where the bolt is not tightened, where the second end portion of the washer is in contact with a bottom surface of the bolt base opening, and where there is a first gap between the first end portion of the washer and the bottom surface of the bolt base opening, the washer is accommodated in the bolt base opening, and
also in a state where the bolt is tightened, the first gap is present between the first end portion of the washer and the bottom surface of the bolt base opening.

12. The bolt according to claim 11, further comprising an outer frame member formed outer to the bolt base opening accommodating the washer, the outer frame member defining the bolt base opening,
wherein:
in a state where the bolt is not tightened, a part of a top surface of the outer frame member is an extending portion extending toward the bolt base opening, and the extending portion presses a top surface of the washer.

13. The bolt according to claim 11, wherein:
the bolt head includes at least one element selected from the group consisting of a polygonal nut shape, a driver groove and a wrench opening, and
the first end portion of the washer is secured while being attached to the bottom surface of the bolt base opening.

14. A pair nut, comprising a first nut and a second nut, wherein:
the first nut includes:
a nut main body having a tapped hole formed therein,
a top surface of the nut main body,
a side surface defining the top surface, and
a bottom surface of the nut main body located opposite to the top surface,
a central axis of the tapped hole of the first nut matches a central axis of a bolt corresponding to the pair nut,
the first nut has a bottom opening formed in the bottom surface thereof, the bottom opening having a diameter longer than a diameter of the tapped hole,
a central axis of the bottom opening extends while inclining with respect to the central axis of the bolt corresponding to the pair nut,
the second nut includes:
a nut main body having a tapped hole formed therein,
a top surface of the nut main body,
a side surface defining the top surface, and
a bottom surface of the nut main body located opposite to the top surface,
the second nut includes a top protrusion on the top surface thereof, the top protrusion corresponding to the bottom opening of the first nut, and
a central axis of the tapped hole formed in the top protrusion and the nut main body matches the central axis of the bolt corresponding to the pair nut.

15. The pair nut according to claim 14, wherein:
the bottom opening of the first nut has a bottom inclining plane shaped like a cut-out portion of a side surface of a conical shape,
the top protrusion of the second nut has an inclining outer side surface,
in a state where the top protrusion of the second nut is inserted into the bottom opening of the first nut, a gap is formed between the bottom surface of the first nut and the top surface of the second nut, and in a state where the first nut and the second nut are tightened to the bolt, the bottom surface of the first nut and the top surface of the second nut are in contact with each other.

16. The pair nut according to claim 14, wherein in a state where the top protrusion of the second nut is inserted into the bottom opening of the first nut, the side surface of the first nut and the side surface of the second nut are covered with a shrink film, and the first nut and the second nut are secured to each other to be integral.

17. The pair nut according to claim 16, wherein the side surface of the first nut and the side surface of the second nut define a polygonal nut.

18. The pair nut according to claim 16, wherein:
the side surface of the first nut and the side surface of the second nut of the pair nut are aligned to each other in a vertical direction,
before the pair nut is tightened to the bolt, there is a gap between the bottom surface of the first nut and the top surface of the second nut, and
after the pair nut is tightened to the bolt, the shrink film is broken, and the bottom surface of the first nut and the top surface of the second nut are in contact with each other.

19. The pair nut according to claim 14, wherein:
the top surface and the bottom surface of the first nut are parallel to each other, and
the top surface and the bottom surface of the second nut are parallel to each other.

20. A pair nut, comprising a first nut and a second nut, wherein:
the first nut includes:
a nut main body having a tapped hole formed therein,
a top surface of the nut main body,
a side surface defining the top surface, and
a bottom surface of the nut main body located opposite to the top surface,
a central axis of the tapped hole of the first nut matches a central axis of a bolt corresponding to the pair nut,
the first nut has a bottom opening formed in the bottom surface thereof, the bottom opening having a diameter longer than a diameter of the tapped hole,
the second nut includes:
a nut main body having a tapped hole formed therein,
a top surface of the nut main body,
a side surface defining the top surface, and
a bottom surface of the nut main body located opposite to the top surface,
the second nut includes a top protrusion on the top surface thereof, the top protrusion corresponding to the bottom opening of the first nut,
a central axis of the tapped hole formed in the top protrusion and the nut main body matches the central axis of the bolt corresponding to the pair nut,
the pair nut is structured such that at a time of tightening the first nut and the second nut to the bolt, a part of a top surface of the top protrusion of the second nut contacts, with priority, the bottom opening of the first nut.

21. The pair nut according to claim 20, wherein:
at the time of tightening the first nut and the second nut to the bolt, in the case where the bolt extends in a vertical direction, the pair nut acts to apply a horizontal force to the bolt so as to eliminate a gap formed at a position where the first nut and the second nut are in engagement with each other, the bottom opening of the first nut has a bottom inclining plane shaped like a cut-out portion of a side surface of a conical shape, the top protrusion of the second nut has an inclining outer side surface, in a state where the top protrusion of the second nut is inserted into the bottom opening of the first nut, a gap is formed between the bottom surface of the first nut and the top surface of the second nut, and in a state where the first nut and the second nut are tightened to the bolt, the bottom surface of the first nut and the top surface of the second nut are in contact with each other.

22. The pair nut according to claim 20, wherein in a state where the first nut and the second nut are tightened to the bolt, the top protrusion of the second nut extends in an oblique direction.

23. The pair nut according to claim 20, wherein the top surface of the nut main body of the second nut is inclining with respect to the bottom surface of the nut main body of the second nut.

24. The pair nut according to claim 20, wherein the top surface, of the top protrusion, that is outer to the tapped hole of the second nut has a uniform thickness.

25. The pair nut according to claim 20, wherein in a state where the top protrusion of the second nut is inserted into the bottom opening of the first nut, the side surface of the first nut and the side surface of the second nut are covered with a shrink film, and the first nut and the second nut are secured to each other to be integral.

26. The pair nut according to claim 25, wherein the side surface of the first nut and the side surface of the second nut define a polygonal nut.

27. The pair nut according to claim 25, wherein:

the side surface of the first nut and the side surface of the second nut of the pair nut are aligned to each other in a vertical direction, before the pair nut is tightened to the bolt, there is a gap between the bottom surface of the first nut and the top surface of the second nut, and after the pair nut is tightened to the bolt, the shrink film is broken, and the bottom surface of the first nut and the top surface of the second nut are in contact with each other.

* * * * *